(12) United States Patent
Rose et al.

(10) Patent No.: US 10,452,409 B2
(45) Date of Patent: Oct. 22, 2019

(54) UNIVERSAL ADAPTER FOR NATIVE CALLING

(71) Applicant: Oracle International Corporation, Redwood Shores, CA (US)

(72) Inventors: John R. Rose, San Jose, CA (US); Vladimir Ivanov, Saint Petersburg (RU); Mikael Vidstedt, Solna (SE)

(73) Assignee: Oracle International Corporation, Redwood Shores, CA (US)

( * ) Notice: Subject to any disclaimer, the term of this patent is extended or adjusted under 35 U.S.C. 154(b) by 22 days.

(21) Appl. No.: 15/331,188

(22) Filed: Oct. 21, 2016

(65) Prior Publication Data

US 2017/0115975 A1    Apr. 27, 2017

Related U.S. Application Data

(60) Provisional application No. 62/245,778, filed on Oct. 23, 2015.

(51) Int. Cl.
  *G06F 9/54*    (2006.01)
  *G06F 9/448*   (2018.01)
  *G06F 9/455*   (2018.01)

(52) U.S. Cl.
  CPC ............ *G06F 9/4484* (2018.02); *G06F 9/541* (2013.01); *G06F 9/45504* (2013.01)

(58) Field of Classification Search
  CPC .......... G06F 9/54; G06F 9/541; G06F 9/4552; G06F 9/4484; G06F 9/45504; G06F 9/45508

USPC .................. 717/139; 719/330, 331
  See application file for complete search history.

(56) References Cited

U.S. PATENT DOCUMENTS

| | | | | |
|---|---|---|---|---|
| 5,146,593 A * | 9/1992 | Brandle | ................ | G06F 9/4484 719/328 |
| 5,269,021 A * | 12/1993 | Denio | ................... | G06F 9/4484 719/323 |
| 5,524,253 A * | 6/1996 | Pham | ....................... | G06F 9/46 703/27 |
| 5,710,923 A * | 1/1998 | Jennings | ................. | G06F 9/546 709/215 |
| 5,729,748 A * | 3/1998 | Robbins | ................ | G06F 9/4484 717/137 |
| 6,047,323 A * | 4/2000 | Krause | ...................... | G06F 9/54 709/227 |
| 6,298,391 B1 * | 10/2001 | Kennedy | ................. | G06F 9/547 718/101 |

(Continued)

*Primary Examiner* — Jason D Mitchell
(74) *Attorney, Agent, or Firm* — Hickman Palermo Becker Bingham LLP

(57) ABSTRACT

In one approach, a native call is performed using an adapter generator to produce an adapter for converting memory structures between a first memory representation adhering to a first application binary interface (ABI) and a second memory representation adhering to a second memory representation adhering to a second ABI. In some cases, the adapter produced by the adapter generator is stored in an adapter cache and indexed by the shape of the call for later reuse should the same native call be made again in the future. The adapter produced by the adapter generator uses a set of intermediate instructions which can be either compiled by a Just-in-Time (JIT) compiler or interpreted by an interpreter to produce executable instructions for converting between the first ABI and the second ABI.

28 Claims, 8 Drawing Sheets

(56) References Cited

U.S. PATENT DOCUMENTS

| | | | | |
|---|---|---|---|---|
| 6,408,433 B1* | 6/2002 | Click, Jr. | G06F 8/441 | 717/154 |
| 6,968,557 B1* | 11/2005 | Zhang | G06F 9/5016 | 719/319 |
| 7,353,504 B2* | 4/2008 | Lagergren | G06F 8/4441 | 717/136 |
| 7,530,059 B2* | 5/2009 | Kielstra | G06F 9/45516 | 717/148 |
| 7,607,128 B2* | 10/2009 | Arthurs | G06F 9/449 | 718/1 |
| 7,861,234 B1* | 12/2010 | Lobo | G06F 8/52 | 717/136 |
| 9,690,709 B2 | 6/2017 | Sandoz et al. | | |
| 9,830,176 B2* | 11/2017 | Andrus | G06F 9/45516 | |
| 2002/0188595 A1* | 12/2002 | Underseth | G06F 8/36 | |
| 2004/0243534 A1* | 12/2004 | Culter | G06F 9/4411 | |
| 2005/0015781 A1* | 1/2005 | Brown | G06F 9/4486 | 719/331 |
| 2006/0037010 A1* | 2/2006 | Willoughby | G06F 8/441 | 717/151 |
| 2006/0070028 A1* | 3/2006 | Belov | G06F 9/4484 | 717/114 |
| 2006/0156314 A1* | 7/2006 | Waldorf | G06F 9/4484 | 719/328 |
| 2006/0190934 A1* | 8/2006 | Kielstra | G06F 9/45516 | 717/148 |
| 2007/0136719 A1* | 6/2007 | Lagergren | G06F 8/4441 | 717/140 |
| 2008/0126744 A1* | 5/2008 | Moyer | G06F 9/30043 | 712/4 |
| 2008/0263527 A1* | 10/2008 | Miura | G06F 9/45504 | 717/138 |
| 2009/0055836 A1* | 2/2009 | Supalov | G06F 9/541 | 719/313 |
| 2009/0094586 A1* | 4/2009 | Brown | G06F 8/52 | 717/136 |
| 2010/0287618 A1* | 11/2010 | Howell | G06F 9/468 | 726/26 |
| 2011/0016459 A1* | 1/2011 | Meyers | G06F 9/45508 | 717/139 |
| 2011/0047533 A1* | 2/2011 | Gschwind | G06F 8/447 | 717/140 |
| 2012/0246614 A1* | 9/2012 | Sliwowicz | G06F 9/4411 | 717/107 |
| 2013/0042258 A1* | 2/2013 | Rector | G06F 8/51 | 719/328 |
| 2013/0086598 A1* | 4/2013 | Gschwind | G06F 9/3832 | 719/330 |
| 2014/0040921 A1* | 2/2014 | Li | G06F 9/54 | 719/320 |
| 2014/0046649 A1* | 2/2014 | Wu | G06F 9/45504 | 703/26 |
| 2014/0096147 A1* | 4/2014 | Aarts | G06F 9/4425 | 719/320 |
| 2015/0227674 A1* | 8/2015 | Dumont | G06F 17/5022 | 716/107 |
| 2015/0277867 A1* | 10/2015 | Hasabnis | G06F 8/433 | 717/164 |
| 2015/0331727 A1* | 11/2015 | Mameri | G06F 9/546 | 719/315 |
| 2015/0339137 A1* | 11/2015 | Andrus | G06F 9/4552 | 717/148 |
| 2016/0011982 A1 | 1/2016 | Sandoz et al. | | |
| 2016/0011992 A1 | 1/2016 | Sandoz et al. | | |
| 2016/0062878 A1 | 3/2016 | Westrelin et al. | | |
| 2016/0077850 A1* | 3/2016 | Andrus | G06F 9/4552 | 717/139 |
| 2016/0357586 A1* | 12/2016 | Rose | G06F 9/445 | |
| 2017/0115975 A1* | 4/2017 | Rose | G06F 9/4484 | |

\* cited by examiner

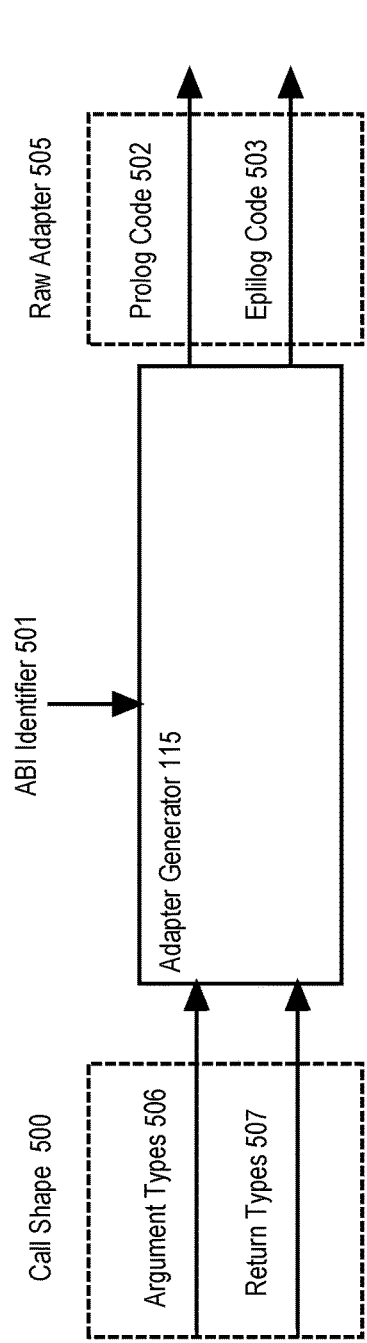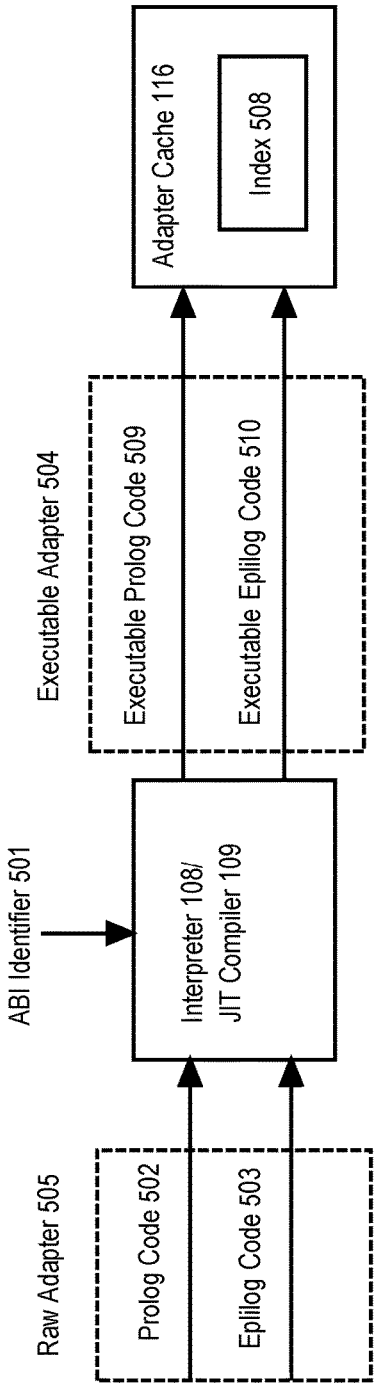
FIG. 5A
FIG. 5B

UNIVERSAL ADAPTER FOR NATIVE CALLING

PRIORITY CLAIMS AND RELATED APPLICATIONS

This application claims priority to Provisional Application 62/245,778 entitled "UNIVERSAL ADAPTER FOR NATIVE CALLING" filed on Oct. 23, 2015, the entire contents of which is hereby incorporated by reference as if fully set forth herein.

TECHNICAL FIELD

Embodiments relate generally to an adapter for calling native methods. Embodiments more specifically relate to an adapter for calling native methods that can utilized efficiently in both interpreted and compiled environments.

BACKGROUND

In computing, a "native" call is when one program executes code which has been compiled for a particular hardware and/or software platform. For example, the called "native" code may represent machine code directed towards a particular hardware platform, such as a particular model of Central Processing Unit (CPU), or an intermediate form of code (such as bytecode) which is executed by an interpreter or compiler of a software platform in response to the call. Thus, most commonly, native calls are made when the instructions that are being invoked from the call are directed towards a platform that differs from the platform of the calling code. For example, Java bytecodes may cause invocation of machine instructions which access a particular hardware intrinsic implemented by the underlying CPU or may cause invocation of instructions compiled from C++ code in order to leverage features of a particular C++ library.

The functionality provided by the called native code (or virtually any call) is typically defined by at least the argument types representing the input to the call and the return types representing the output from the call. This is often referred to as the "type" or "shape" of the call. For example, the called native code may represent machine code which causes execution of an intrinsic which counts the number of leading zeros in an integer. Thus, in this example, the type is defined as a set of code which takes an integer as input and returns an integer as output.

For non-native calls, calls between sets of instructions which are directed towards the same platform, the manner in which the arguments are supplied to the called instructions and returned from the called instructions is typically performed in a consistent manner. For example, in the Java Virtual Machine (JVM) information is typically passed from one method to another by placing the arguments (or references to the arguments in the case of non-primitive types) onto an operand stack of the current stack frame and executing the call by popping off and feeding the contents of the arguments to the invoked instruction. The called code then returns a result of the execution by pushing the return values back onto the operand stack for consumption by the caller.

In a JVM environment, the called code makes an implicit assumption that the layout of the arguments in memory adheres to the expected format (placed in order of the argument types by value or reference onto the operand stack). In addition, the calling code makes an implicit assumption that the return values will be placed back onto the operand stack (by value or reference) in an order consistent with the return types defining the call. As another example, a particular CPU may support hardware intrinsics which assume certain types of arguments will be placed in specific "categories" or "classes" of registers with the result of the execution placed in other registers. The rules defining how arguments are presented in memory for consumption by the called instructions and how the return values are placed in memory for consumption by the calling instructions is referred to as a calling convention. To promote efficiency, a platform generally maintains a consistent calling convention which avoids the need to map between different models of arguments and return values in memory. However, there are exceptions where the same platform supports multiple calling conventions for different types of calls, such as calls directed towards different components of the same platform. In some cases, the calling convention used by a platform is written into a document, referred to as an Application Binary Interface (ABI), which describes the low-level mechanizations which are required to pass data to and from code directed towards the platform. The term ABI may be used interchangeably with the term calling convention.

Calling conventions for different platforms can differ in many factors, such as where arguments, return values, and return addresses are placed (in registers, on the stack, a mix of both, or in other memory structures), the order in which the arguments are passed, how return values are delivered back to the caller (on the stack, in a register, within the heap), how the task of cleaning up before and cleaning up after a function call is divided between the caller and the callee, how metadata describing the arguments and/or return types is to be passed, which registers must be returned to their initial states after the call, and so forth. The aforementioned list is not exhaustive, as any platform could specify virtually any kind of rules regarding how data should be transferred between the caller and the callee. As a result, when attempting to make calls between instructions pertaining to different platforms (sometimes referred to as cross-ABI calls), "adapter" code is required to manipulate how the arguments are stored in memory to match the calling convention of the called instructions and how the result of the execution is to be retrieved and reformatted for the calling convention of the calling instructions. The code executed to prepare for the call is referred to as "prolog" code and the code executed to clean up after the call is referred to as "epilog" code. Although "prolog" code has been described above only in relation to preparing the arguments in memory, in some cases the prolog code also performs tasks to prepare for a return value, such as setting aside space in memory, for example space on the stack and/or heap, for the called native code to deposit return values. For instance, the call to the native code may provide a set of pointers or other memory reference to the allocated space to inform the called native code of where one or more return values should be placed. Thus, an adapter is a component which accepts as input the argument and return types of the call and then provides the prolog and/or epilog code which wraps around the invocation to the native instructions.

Conventionally, adapters are hand written to perform transformations of the memory structures holding the arguments and/or return values to adhere to a particular calling convention or ABI. This process usually entails a human programmer or team of human programmers examining the written description of the calling convention/ABI and hand crafting code embodying the logic for how calls matching a certain type (certain set of argument and return types) should map to the underlying memory structures (registers, stack slots, heap space, etc.) used to store values of those types. For example, the adapter may embody rules such as, types which can fit into general purpose registers are placed in the next available general purpose register with spillover onto space on the stack and types which can fit into floating point registers are placed in the next available floating point register with spillover onto the stack. Thus, the adapter code would iterate over the arguments types and determine which memory structure to store the value corresponding to the argument type according to the rules of the target calling convention.

The process described above is also substantially related to the concept of register allocation and stack allocation, which are components that determine which memory constructs (registers and stack slots respectively) should be used to store values for the argument types and return types across a single call or over multiple calls during the execution of a program. For example, oftentimes allocation is performed by leveraging graph coloring techniques to find a mapping of variables used in a program to memory constructs which minimizes cases where the same memory construct would have to store two values at the same time. The conflict is typically resolved by "spill over", which swaps out the value of a register with a value from another area of memory (such as stack space stored on RAM), performs the call, and then swaps the values back. This is especially important for bounded memory structures, such as registers, where only a limited number of storage elements of that type are available to the platform of the called native instructions. In some cases, the adapter component can be combined with the allocater, such as described in "Method and Apparatus Building Calling Convention Prolog and Epilog Code Using a Register Allocator" by Click, Jr., et al, U.S. Pat. No. 6,408,433, (hereinafter Click Jr.) which is hereby incorporated by reference as though fully stated herein.

In some cases, such as with the Click Jr., reference, the mapping between the argument/return types and the memory structures are output as a set of "calling convention" instructions, which specify the steps required to populate the structures used to pass the arguments and retrieve values from the structured used to store the return values. These instructions are often written in an intermediate language, such as assembly code or instructions resembling assembly code, which can be processed by an interpreter or compiler to generate the machine instructs required to perform the aforementioned memory manipulations. However, in current techniques, the calling convention instructions have not been defined robustly enough to enable porting across multiple different types of ABIs. As a result, present adapters are typically hard coded for one or a small set of ABIs that the adapter can actually support. In addition, as technology progresses new types of memory structures become available. For example, one of the newer types of memory structures available on present CPUs are vector registers which allow operations on vectors of data to be natively performed by the underlying hardware. Since current adapters are typically developed with a particular operating environment in mind, the adapters work under an assumption that the types of memory constructs available to store data for use by called instructions remain constant over time, often resulting in the adapter or the set of calling convention instructions that can be emitted to be changed frequently over time to keep up with evolving technology. Furthermore, conventional adapters are typically designed to be suitable for one particular mode of execution, such as compiled or interpreted, but may be inefficient or extremely difficult to make compatible with other forms of execution. As a result, there is need for an adapter and encodings for calling conventions that are readily adaptable to virtually any type of ABI, any type of memory structure which can be utilized by an ABI, and which performs well under both compiled and interpreted forms of execution.

BRIEF DESCRIPTION OF THE DRAWINGS

The present invention is illustrated by way of example, and not by way of limitation, in the figures of the accompanying drawings and in which like reference numerals refer to similar elements and in which:

FIG. 5A illustrates a general overview of a process flow for generating a raw adapter according to an embodiment.

FIG. 5B illustrates a general process flow for generating an executable adapter and caching the executable adapter according to an embodiment.

DETAILED DESCRIPTION

Figure 1:
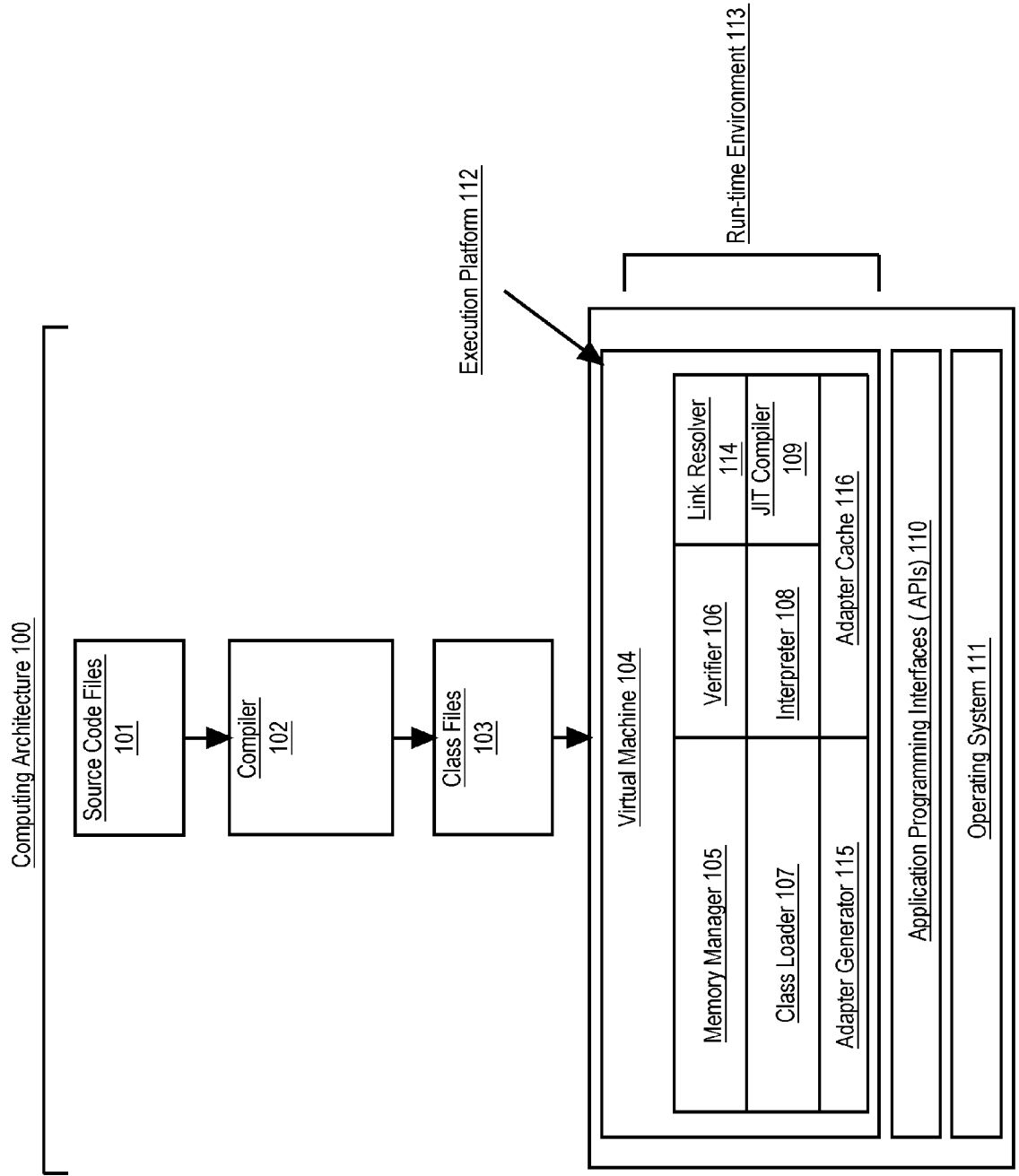
FIG. 1 illustrates an example computing architecture in which techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:
1.0 General Overview
2.0 Example Operating Environment
   2.1 Example Class File Structure
   2.2 Example Virtual Machine Architecture
   2.3 Loading, Linking, and Initializing
3.0 Storage Locations
4.0 Adapter Generation General Process Flow
5.0 Example Adapter Instruction Set
6.0 Example Calling Convention Rules
7.0 Native Call Process Flow
8.0 Adapter Generation Prolog Process Flow
9.0 Adapter Generation Epilog Process Flow
10.0 Code Generation Examples
11.0 Extensions and Alternatives
12.0 Additional Disclosure
1.0. General Overview
Described herein are techniques that allow quick and efficient native calls to be made between code executing on platforms that have different calling conventions.

The techniques described herein use terms and definitions from the Java programming language, the Java Virtual Machine ("JVM"), and the Java Runtime Environment. It is contemplated, however, that the described techniques may be used in conjunction with any programming language, virtual machine architecture, or run-time environment. Thus, for example, terminology described in Java terms, such as "methods", are interchangeable with other terminology, such as "functions" and "logic". Thus, the term "method" does not to limit the application of the techniques described herein to Java, the JVM, or any particular language or operating environment. Furthermore, the term "method" is also synonymous with the terms "class method" or "object method". A method is a set or block of code which is referred to by name and can be called at various points in a program, which causes the method's code to be executed. The term "invoke" is also synonymous with the term "call". Thus, when a first method "calls" or "invokes" a second method, this represents the first method causing the second method to be executed. A point in a program which invokes a method is described variously using terms such as "call site", "invocation instruction", "invoke command", and so forth.

In an embodiment, the types of memory manipulations that are performed by adapters to transform the memory structures holding variables from one ABI to another ABI is reduced down to a set of intermediate instructions. These intermediate instructions are written in a generic format in order to be applicable to virtually any ABI and any hardware architecture. For example, the instruction set may include SKIP instructions, PULL instructions, STOP instructions, CREATE_BUFFER instructions, and PULL_BUFFER_LABEL instructions. In order to obtain executable code that performs the memory manipulations required to transform the memory structures from the format of one ABI to another, the intermediate instructions are fed into an interpreter, compiler, or combination of both to obtain code that can actually be executed by the underlying hardware platform.

In an embodiment, the instruction set above assumes that the interpreter or compiler receiving the intermediate instructions iterate through a number storage locations of storage categories available to the ABI (e.g. general purpose registers, vector registers, stack space, heap space, etc.) and either pulling arguments into the storage slot with the PULL instruction, skipping the current storage location with the SKIP instruction, or moving on to the next storage category with the STOP instruction. The CREATE_BUFFER instruction is used to cause the interpreter and/or compiler to allocate space in unbounded storage (e.g. stack or heap space) and also causes the memory address to that allocated space (referred to as a "label") to be added data structure, such as a queue. Some ABIs require that labels to space holding the arguments or reserved for the return of a value to be placed in specific storage locations, such as specific registers. The PULL_BUFFER_LABEL instruction pulls the next label from the data structure holding the labels into the next storage location as required. Thus, the interpreter or compiler iterates through the storage locations and categories while processing the intermediate instruction to convert those instructions into executable instructions that can actually be fed into the one or more processors of the computing architecture to cause the associated effect.

In some embodiments, the aforementioned instruction set is designed to allow the interpreter or compiler to iterate over storage locations, rather than arguments or return values, in order to allow the intermediate instructions to potentially be interpreted or compiled without sacrificing efficiency and to allow the logic handling the transformation to be simpler to code.

In an embodiment, the intermediate structure for a particular adapter is generated by an adapter generator component. The adapter generator takes as input a call shape (argument types and return types of the call to the native instructions) and then outputs intermediate code using the aforementioned instruction set that performs both the prolog steps and epilog steps of the call. The prolog steps refers to the actions taken to conform the memory structures holding the arguments to adhere to the ABI of the native instructions being called. The prolog steps may also include allocating space in unbounded storage (e.g. the stack or the heap) to hold the arguments or memory locations where the executed native instructions will place the return of the call. The epilog steps include the steps performed to conform the memory structures holding the return value(s) after the call to the ABI of the calling method. The instructions embodying the prolog steps is referred to as "prolog code" and the instructions embodying the epilog steps is referred to as "epilog code".

In an embodiment, the general steps performed to make a native call include: (1) generate a raw adapter encoded using the aforementioned instruction set that embodies both the prolog and epilog code that the virtual machine needs to perform to conform the memory structures between the source and target ABI, (2) compile the raw adapter into an executable adapter via the interpreter or compiler, (3) execute the prolog code of the executable adapter, (4) execute the native instructions, (4) execute the epilog code of the executable adapter, and (5) pass execution back to the calling method.

In some embodiments, to prevent the virtual machine from performing redundant work, the executable adapter referred to above is stored in an adapter cache with an index based on the call shape and ABI used by the native call. Thus, when a native call is received which uses the same call shape and ABI, the virtual machine is able to skip the step of generating the raw and executable adapters and simply retrieves and executes the cached adapter.

2.0 Example Operating Architecture

FIG. 1 illustrates an example computing architecture 100 in which techniques described herein may be practiced.

As illustrated in FIG. 1, a computing architecture 100 includes source code files 101 which are compiled by a compiler 102 into class files 103 representing the program to be executed. The class files 103 are then loaded and executed by an execution platform 112, which includes a run-time environment 113, an operating system 111, and one or more application programming interfaces (APIs) 110 that enable communication between the run-time environment 113 and the operating system 111. The run-time environment 113 includes a virtual machine 104 comprising various components, such as a memory manager 105 (which may include a garbage collector), a verifier 106 to check the validity of the class files 103 and method instructions, a class loader 107 to locate and build in-memory representations of classes, an interpreter 108 for executing the virtual machine 104 code, a just-in-time (JIT) compiler 109 for producing optimized machine-level code, a link resolver 114 for resolving symbolic references to classes and/or methods, an adapter generator 115 for generating adapters for making native calls, and an adapter cache 116 for storing generated adapters for repeated use.

In an embodiment, the computing architecture 100 includes source code files 101 that contain code written in a particular programming language, such as Java, C, C++, C#, Ruby, Perl, and so forth. Thus, the source code files 101 adhere to a particular set of syntactic and/or semantic rules for the associated language. For example, code written in Java adheres to the Java Language Specification. However, since specifications are updated and revised over time, the source code files 101 may be associated with a version number indicating the revision of the specification to which the source code files 101 adhere. The exact programming language used to write the source code files 101 is generally not critical.

In various embodiments, the compiler 102 converts the source code, which is written according to a specification directed to the convenience of the programmer, to either machine or object code, which is executable directly by the particular machine environment, or an intermediate representation ("virtual machine code/instructions"), such as bytecode, which is executable by a virtual machine 104 that is capable of running on top of a variety of particular machine environments. The virtual machine instructions are executable by the virtual machine 104 in a more direct and efficient manner than the source code. Converting source code to virtual machine instructions includes mapping source code functionality from the language to virtual machine functionality that utilizes underlying resources, such as data structures. Often, functionality that is presented in simple terms via source code by the programmer is converted into more complex steps that map more directly to the instruction set supported by the underlying hardware on which the virtual machine 104 resides.

In general, programs are executed either as a compiled or an interpreted program. When a program is compiled, the code is transformed globally from a first language to a second language before execution. Since the work of transforming the code is performed ahead of time; compiled code tends to have excellent run-time performance. In addition, since the transformation occurs globally before execution, the code can be analyzed and optimized using techniques such as constant folding, dead code elimination, inlining, and so forth. However, depending on the program being executed, the startup time can be significant. In addition, inserting new code would require the program to be taken offline, re-compiled, and re-executed. When a program is interpreted, the code of the program is read line-by-line and converted to machine-level instructions while the program is executing. As a result, the program has a short startup time (can begin executing almost immediately), but the run-time performance is diminished by performing the transformation on the fly. Furthermore, since each instruction is analyzed individually, many optimizations that rely on a more global analysis of the program cannot be performed.

In some embodiments, the virtual machine 104 includes an interpreter 108 and a JIT compiler 109 (or a component implementing aspects of both), and executes programs using a combination of interpreted and compiled techniques. For example, the virtual machine 104 may initially begin by interpreting the virtual machine instructions representing the program via the interpreter 108 while tracking statistics related to program behavior, such as how often different sections or blocks of code are executed by the virtual machine 104. Once a block of code surpass a threshold (is "hot"), the virtual machine 104 invokes the JIT compiler 109 to perform an analysis of the block and generate optimized machine-level instructions which replaces the "hot" block of code for future executions. Since programs tend to spend most of their time executing a small portion of their overall code, compiling just the "hot" portions of the program can provide similar performance to fully compiled code, but without the start-up penalty.

In order to provide clear examples, the source code files 101 have been illustrated as the "top level" representation of the program to be executed by the execution platform 111. However, although the computing architecture 100 depicts the source code files 101 as a "top level" program representation, in other embodiments the source code files 101 may be an intermediate representation received via a "higher level" compiler that processed code files in a different language into the language of the source code files 101. In order to illustrate clear examples, the following disclosure assumes that the source code files 101 adhere to a class-based object-oriented programming language. However, this is not a requirement to utilizing the features described herein.

In an embodiment, compiler 102 receives as input the source code files 101 and converts the source code files 101 into class files 103 that are in a format expected by the virtual machine 104. For example, in the context of the JVM, Chapter 4 of the Java Virtual Machine Specification defines a particular class file format to which the class files 103 are expected to adhere. In some embodiments, the class files 103 contain the virtual machine instructions that have been converted from the source code files 101. However, in other embodiments, the class files 103 may contain other structures as well, such as tables identifying constant values and/or metadata related to various structures (classes, fields, methods, and so forth).

The following discussion will assume that each of the class files 103 represents a respective "class" defined in the source code files 101 (or dynamically generated by the compiler 102 and/or virtual machine 104). However, the aforementioned assumption is not a strict requirement and will depend on the implementation of the virtual machine 104. Thus, the techniques described herein may still be performed regardless of the exact format of the class files 103. In some embodiments, the class files 103 are divided into one or more "libraries" or "packages", each of which includes a collection of classes that provide related functionality. For example, a library may contain one or more class files that implement input/output (I/O) operations, mathematics tools, cryptographic techniques, graphics utilities, and so forth. Further, some classes (or fields/methods within those classes) may include access restrictions that limit their use to within a particular class/library/package or to classes with appropriate permissions.

2.1 Example Class File Structure

Figure 2:
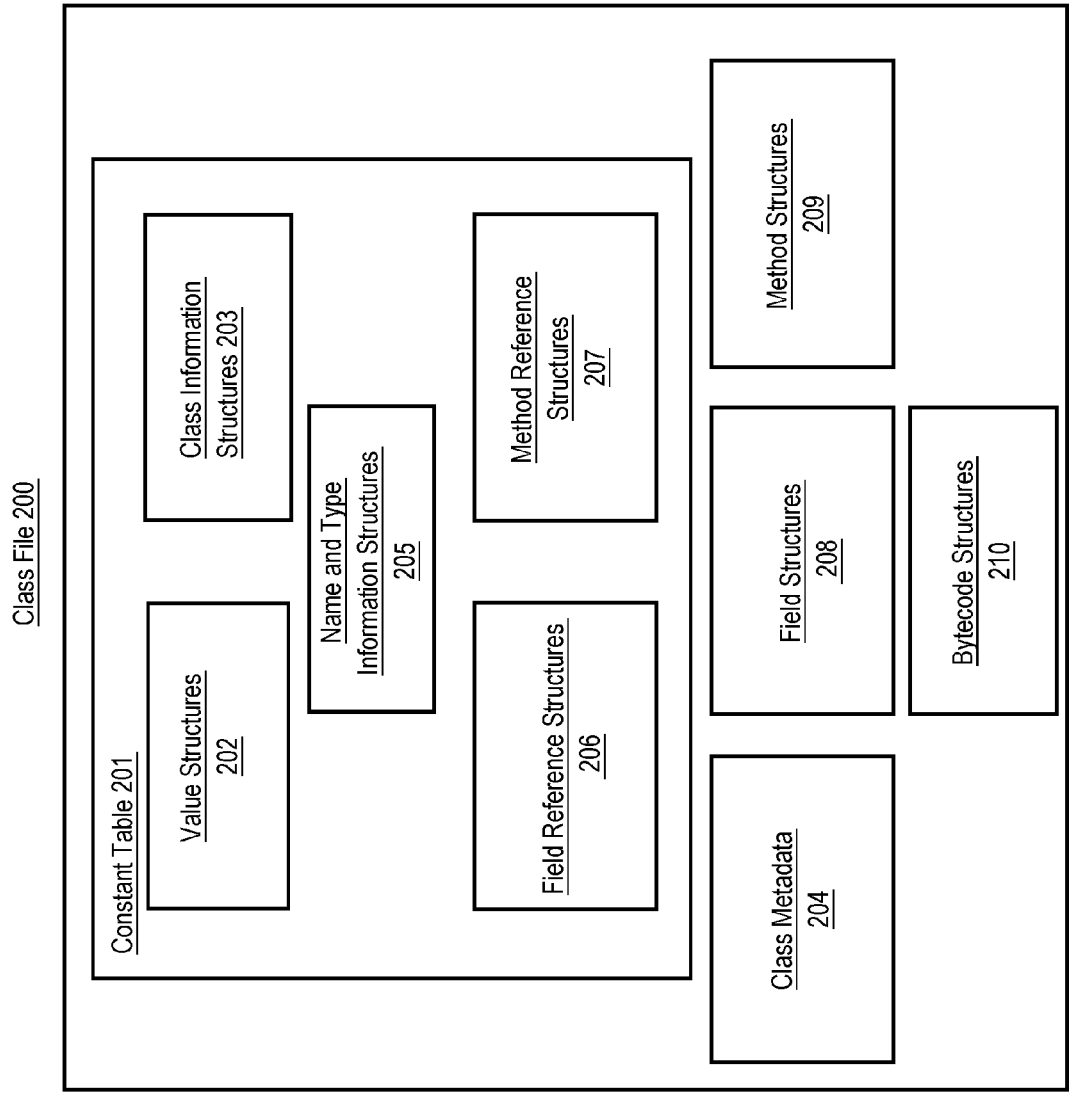
FIG. 2 is a block diagram illustrating one embodiment of a computer system suitable for implementing methods and features described herein.

FIG. 2 illustrates an example structure for a class file 200 in block diagram form according to an embodiment. In order to provide clear examples, the remainder of the disclosure assumes that the class files 103 of the computing architecture 100 adhere to the structure of the example class file 200 described in this section. However, in a practical environment, the structure of the class file 200 will be dependent on the implementation of the virtual machine 104. Further, one or more features discussed herein may modify the structure of the class file 200 to, for example, add additional structure types. Therefore, the exact structure of the class file 200 is not critical to the techniques described herein. For the purposes of Section 2.1, "the class" or "the present class" refers to the class represented by the class file 200.

In FIG. 2, the class file 200 includes a constant table 201, field structures 208, class metadata 204, method structures 209, and code structures 210.

In an embodiment, the constant table 201 is a data structure which, among other functions, acts as a symbol table for the class. For example, the constant table 201 may store data related to the various identifiers used in the source code files 101 such as type, scope, contents, and/or location. The constant table 201 has entries for value structures 202 (representing constant values of type int, long, double, float, byte, string, and so forth), class information structures 203, name and type information structures 205, field reference structures 206, and method reference structures 207 derived from the source code files 101 by the compiler 102. In an embodiment, the constant table 201 is implemented as an array that maps an index i to structure j. However, the exact implementation of the constant table 201 is not critical.

In some embodiments, the entries of the constant table 201 include structures which index other constant table 201 entries. For example, an entry for one of the value structures 202 representing a string may hold a tag identifying its "type" as string and an index to one or more other value structures 202 of the constant table 201 storing char, byte or int values representing the ASCII characters of the string.

In an embodiment, field reference structures 206 of the constant table 201 hold an index into the constant table 201 to one of the class information structures 203 representing the class defining the field and an index into the constant table 201 to one of the name and type information structures 205 that provides the name and descriptor of the field. Method reference structures 207 of the constant table 201 hold an index into the constant table 201 to one of the class information structures 203 representing the class defining the method and an index into the constant table 201 to one of the name and type information structures 205 that provides the name and descriptor for the method. The class information structures 203 hold an index into the constant table 201 to one of the value structures 202 holding the name of the associated class. The name and type information structures 205 hold an index into the constant table 201 to one of the value structures 202 storing the name of the field/method and an index into the constant table 201 to one of the value structures 202 storing the descriptor.

In an embodiment, class metadata 204 includes metadata for the class, such as version number(s), number of entries in the constant pool, number of fields, number of methods, access flags (whether the class is public, private, final, abstract, etc.), an index to one of the class information structures 203 of the constant table 201 that identifies the present class, an index to one of the class information structures 203 of the constant table 201 that identifies the superclass (if any), and so forth.

In an embodiment, the field structures 208 represent a set of structures that identifies the various fields of the class. The field structures 208 store, for each field of the class, accessor flags for the field (whether the field is static, public, private, final, etc.), an index into the constant table 201 to one of the value structures 202 that holds the name of the field, and an index into the constant table 201 to one of the value structures 202 that holds a descriptor of the field.

In an embodiment, the method structures 209 represent a set of structures that identifies the various methods of the class. The method structures 209 store, for each method of the class, accessor flags for the method (e.g. whether the method is static, public, private, synchronized, etc.), an index into the constant table 201 to one of the value structures 202 that holds the name of the method, an index into the constant table 201 to one of the value structures 202 that holds the descriptor of the method, and references to which of the method structures 209 holds the virtual machine instructions that correspond to the body of the method as defined in the source code files 101.

In an embodiment, a descriptor represents a type of a field or method. For example, the descriptor may be implemented as a string adhering to a particular syntax. While the exact syntax is not critical, a few examples are described below.

In an example where the descriptor represents a type of the field, the descriptor identifies the type of data held by the field. In an embodiment, a field can hold a basic type, an object, or an array. When a field holds a basic type, the descriptor is a string that identifies the basic type (e.g., "B"=byte, "C"=char, "D"=double, "F"=float, "I"=int, "J"=long int, etc.). When a field holds an object, the descriptor is a string that identifies the class name of the object (e.g. "L ClassName"). "L" in this case indicates a reference, thus "L ClassName" represents a reference to an object of class ClassName. When the field is an array, the descriptor identifies the type held by the array. For example, "[B" indicates an array of bytes, with "[" indicating an array and "B" indicating that the array holds the basic type of byte. However, since arrays can be nested, the descriptor for an array may also indicate the nesting. For example, "[[L ClassName" indicates an array where each index holds an array that holds objects of class ClassName. In some embodiments, the ClassName is fully qualified and includes the simple name of the class, as well as the pathname of the class. For example, the ClassName may indicate where the file is stored in the package, library, or file system hosting the class file 200.

In the case of a method, the descriptor identifies the parameters of the method and the return type of the method. For example, a method descriptor may follow the general form "({ParameterDescriptor}) ReturnDescriptor", where the {ParameterDescriptor} is a list of field descriptors representing the parameters and the ReturnDescriptor is a field descriptor identifying the return type. For instance, the string "V" may be used to represent the void return type. Thus, a method defined in the source code files 101 as "Object m(int I, double d, Thread t) { . . . }" matches the descriptor "(I D L Thread) L Object".

In an embodiment, the virtual machine instructions held in the method structures 209 include operations which reference entries of the constant table 201.

Using Java as an example, consider the following class

```
class A
{
int add12and13( ) {
    return B.addTwo(12, 13);
    }
}
```

In the above example, the Java method add12and13 is defined in class A, takes no parameters, and returns an integer. The body of method add12and13 calls static method addTwo of class B which takes the constant integer values 12 and 13 as parameters, and returns the result. Thus, in the constant table 201, the compiler 102 includes, among other entries, a method reference structure that corresponds to the call to the method B.addTwo. In Java, a call to a method compiles down to an invoke command in the bytecode of the JVM (in this case invokestatic as addTwo is a static method of class B). The invoke command is provided an index into the constant table 201 corresponding to the method reference structure that identifies the class defining addTwo "B", the name of addTwo "addTwo", and the descriptor of addTwo "(I I)I". For example, assuming the aforementioned method reference is stored at index 4, the bytecode instruction may appear as "invokestatic #4".

Since the constant table 201 refers to classes, methods, and fields symbolically with structures carrying identifying information, rather than direct references to a memory location, the entries of the constant table 201 are referred to as "symbolic references". One reason that symbolic references are utilized for the class files 103 is because, in some embodiments, the compiler 102 is unaware of how and where the classes will be stored once loaded into the run-time environment 113. As will be described in Section 2.3, eventually the run-time representation of the symbolic references are resolved into actual memory addresses by the virtual machine 104 after the referenced classes (and associated structures) have been loaded into the run-time environment and allocated concrete memory locations.

2.2 Example Virtual Machine Architecture

Figure 3:
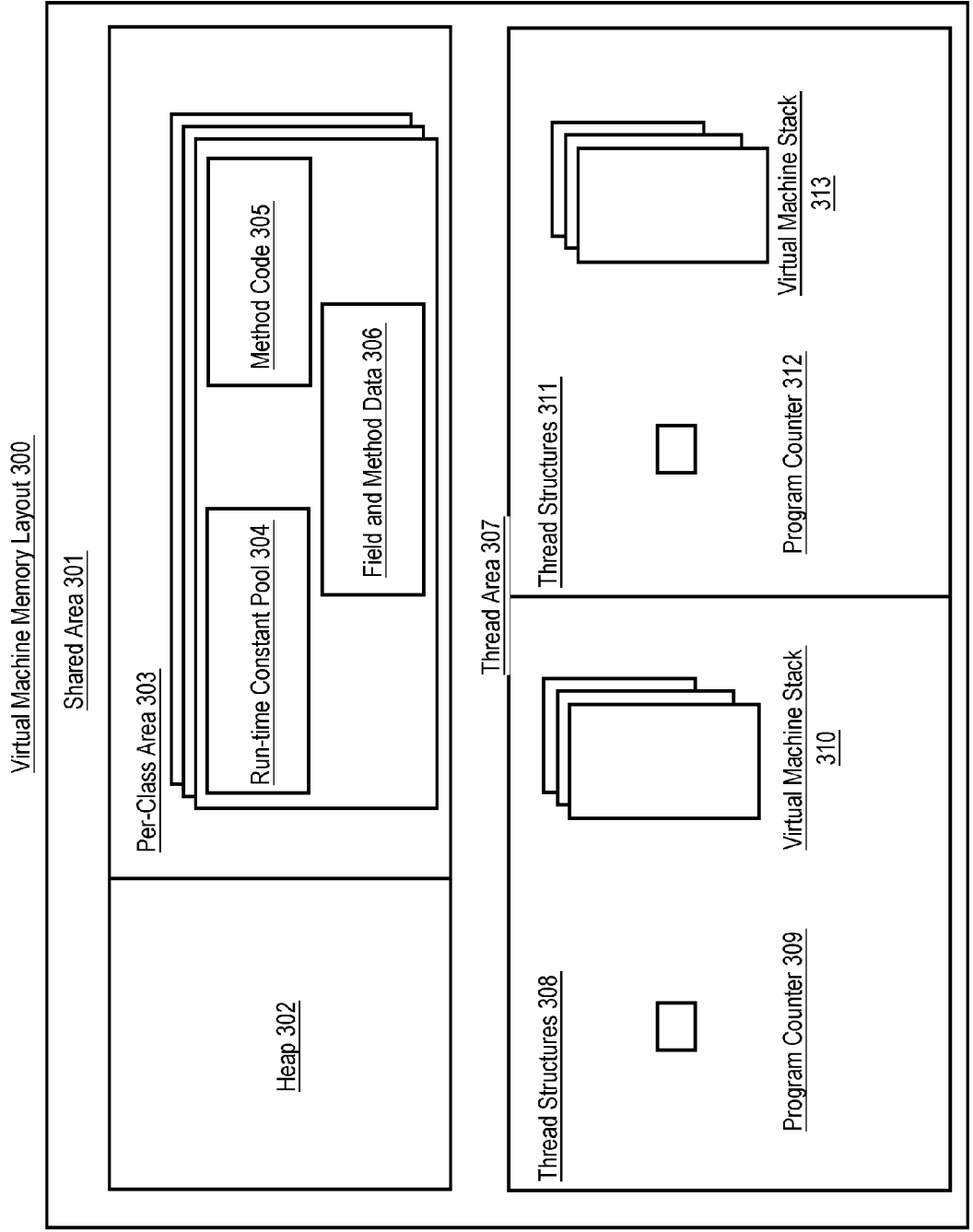
FIG. 3 illustrates an example virtual machine memory layout in block diagram form according to an embodiment.

FIG. 3 illustrates an example virtual machine memory layout 300 in block diagram form according to an embodiment. In order to provide clear examples, the remaining discussion will assume that the virtual machine 104 adheres to the virtual machine memory layout 300 depicted in FIG. 3. In addition, although components of the virtual machine memory layout 300 may be referred to as memory "areas", there is no requirement that the memory areas are contiguous.

In the example illustrated by FIG. 3, the virtual machine memory layout 300 is divided into a shared area 301 and a thread area 307.

The shared area 301 represents an area in memory where structures shared among the various threads executing on the virtual machine 104 are stored. The shared area 301 includes a heap 302 and a per-class area 303. In an embodiment, the heap 302 represents the run-time data area from which memory for class instances and arrays is allocated. In an embodiment, the per-class area 303 represents the memory area where the data pertaining to the individual classes are stored. In an embodiment, the per-class area 303 includes, for each loaded class, a run-time constant pool 304 representing data from the constant table 201 of the class, field and method data 306 (for example, to hold the static fields of the class), and the method code 305 representing the virtual machine instructions for methods of the class.

The thread area 307 represents a memory area where structures specific to individual threads are stored. In FIG. 3, the thread area 307 includes thread structures 308 and thread structures 311, representing the per-thread structures utilized by different threads. In order to provide clear examples, the thread area 307 depicted in FIG. 3 assumes two threads are executing on the virtual machine 104. However, in a practical environment, the virtual machine 104 may execute any arbitrary number of threads, with the number of thread structures scaled accordingly.

In an embodiment, thread structures 308 includes program counter 309 and virtual machine stack 310. Similarly, thread structures 311 includes program counter 312 and virtual machine stack 313. In an embodiment, program counter 309 and program counter 312 store the current address of the virtual machine instruction being executed by their respective threads. Thus, as a thread steps through the instructions, the program counters are updated to maintain an index to the current instruction. In an embodiment, virtual machine stack 310 and virtual machine stack 313 each store frames for their respective threads that hold local variables and partial results, and is also used for method invocation and return.

In an embodiment, a frame is a data structure used to store data and partial results, return values for methods, and perform dynamic linking. A new frame is created each time a method is invoked. A frame is destroyed when the method that caused the frame to be generated completes. Thus, when a thread performs a method invocation, the virtual machine 104 generates a new frame and pushes that frame onto the virtual machine stack associated with the thread. When the method invocation completes, the virtual machine 104 passes back the result of the method invocation to the previous frame and pops the current frame off of the stack. In an embodiment, for a given thread, one frame is active at any point. This active frame is referred to as the current frame, the method that caused generation of the current frame is referred to as the current method, and the class to which the current method belongs is referred to as the current class.

Figure 4:
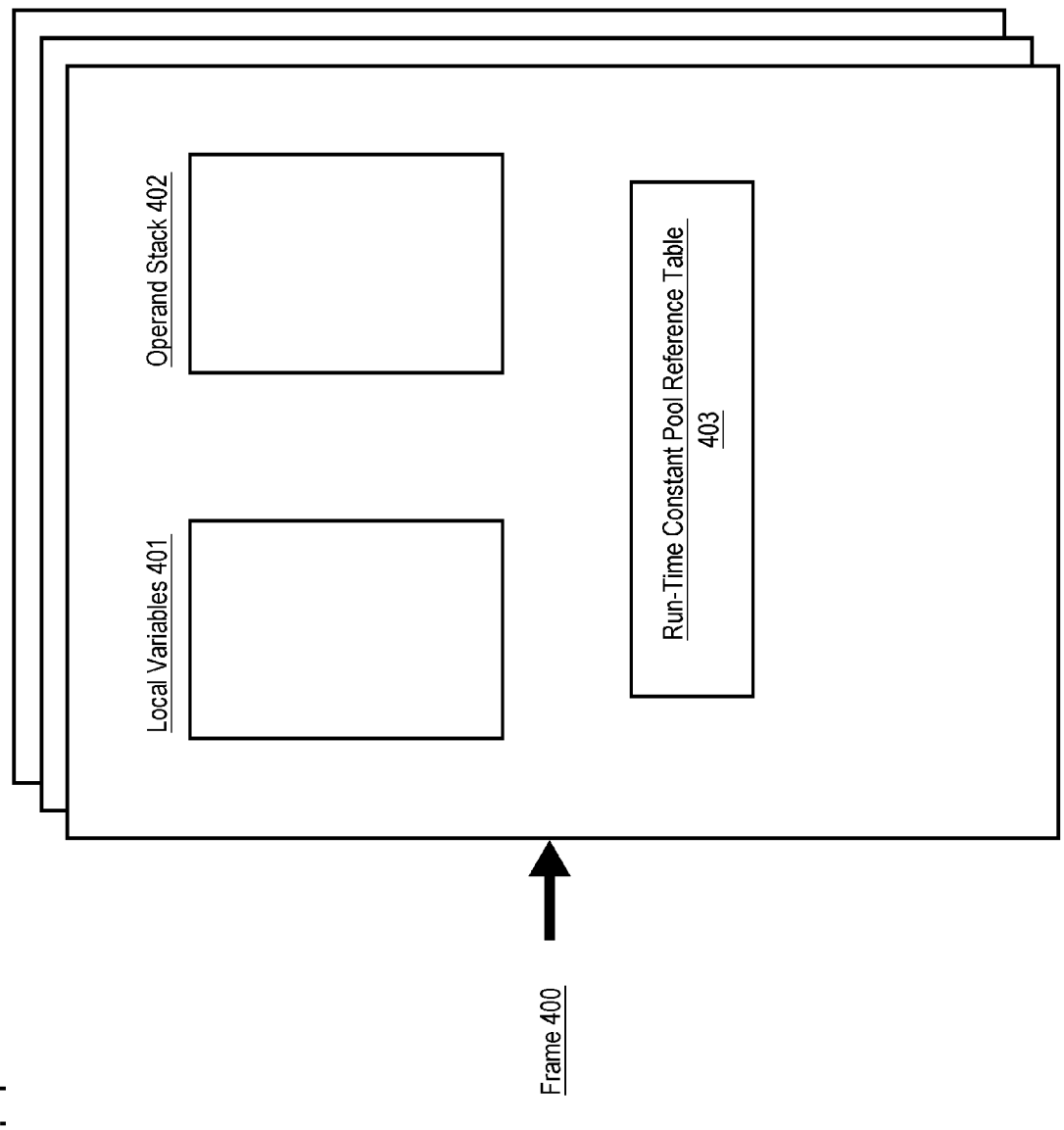
FIG. 4 illustrates an example stack frame in block diagram form according to an embodiment.

FIG. 4 illustrates an example frame 400 in block diagram form according to an embodiment. In order to provide clear examples, the remaining discussion will assume that frames of virtual machine stack 310 and virtual machine stack 313 adhere to the structure of frame 400.

In an embodiment, frame 400 includes local variables 401, operand stack 402, and run-time constant pool reference table 403.

In an embodiment, the local variables 401 are represented as an array of variables that each hold a value, such as Boolean, byte, char, short, int, float, reference, and so forth. Further, some value types, such as longs or doubles, may be represented by more than one entry in the array. The local variables 401 are used to pass parameters on method invocations and store partial results. For example, when generating the frame 400 in response to invoking a method, the parameters may be stored in predefined positions within the local variables 401, such as indexes 1-N corresponding to the first to Nth parameters in the invocation.

In an embodiment, the operand stack 402 is empty by default when the frame 400 is created by the virtual machine 104. The virtual machine 104 then supplies instructions from the method code 305 of the current method to load constants or values from the local variables 401 onto the operand stack 402. Other instructions take operands from the operand stack 402, operate on them, and push the result back onto the operand stack 402. Furthermore, the operand stack 402 is used to prepare parameters to be passed to methods and to receive method results. For example, the parameters of the method being invoked could be pushed onto the operand stack 402 prior to issuing the invocation to the method. The virtual machine 104 then generates a new frame for the method invocation where the operands on the operand stack 402 of the previous frame are popped and loaded into the local variables 401 of the new frame. When the invoked method terminates, the new frame is popped from the virtual machine stack and the return value is pushed onto the operand stack 402 of the previous frame.

Although the local variables 401 and the operand stack 402 are referred to using data structures such as "arrays" and/or "stacks", there is no limit to the type of data structure used to implement those elements. In addition, the data structures referred to herein with respect to the local variables 401 and operand stack 402 relate to high level representations of the data structure. Embodiments can implement those data structures using a variety of lower level storage mechanisms, such as storing one or more values of the local variables 401 and/or the operand stack 402 in one or more registers of a central processing unit (CPU) of the machine hardware executing the virtual machine 104.

In an embodiment, the run-time constant pool reference table 403 contains a reference to the run-time constant pool 304 of the current class. The run-time constant pool reference table 403 is used to support resolution. Resolution is the process whereby symbolic references in the constant pool 304 are translated into concrete memory addresses, loading classes as necessary to resolve as-yet-undefined symbols and translating variable accesses into appropriate offsets into storage structures associated with the run-time location of these variables.

2.3 Loading, Linking, and Initializing

In an embodiment, the virtual machine 104 dynamically loads, links, and initializes classes. Loading is the process of finding a class with a particular name and creating a representation from the associated class file 200 of that class within the memory of the run-time environment 113. For example, creating the run-time constant pool 304, method code 305, and field and method data 306 for the class within the per-class area 303 of the virtual machine memory layout 300. Linking is the process of taking the in-memory representation of the class and combining it with the run-time state of the virtual machine 104 so that the methods of the class can be executed. Initialization is the process of executing the class constructors to set the starting state of the field and method data 306 of the class and/or create class instances on the heap 302 for the initialized class.

The following are examples of loading, linking, and initializing techniques that may be implemented by the virtual machine 104. However, in many embodiments the steps may be interleaved, such that an initial class is loaded, then during linking a second class is loaded to resolve a symbolic reference found in the first class, which in turn causes a third class to be loaded, and so forth. Thus, progress through the stages of loading, linking, and initializing can differ from class to class. Further, some embodiments may delay (perform "lazily") one or more functions of the loading, linking, and initializing process until the class is actually required. For example, resolution of a method reference may be delayed until a virtual machine instruction invoking the referred method is executed. Thus, the exact timing of when the steps are performed for each class can vary greatly between implementations.

To begin the loading process, the virtual machine 104 starts up by invoking the class loader 107 which loads an initial class. The technique by which the initial class is specified will vary from embodiment to embodiment. For example, one technique may have the virtual machine 104 accept a command line argument on startup that specifies the initial class.

To load a class, the class loader 107 parses the class file 200 corresponding to the class and determines whether the class file 200 is well-formed (meets the syntactic expectations of the virtual machine 104). If not, the class loader 107 generates an error. For example, in Java the error might be generated in the form of an exception which is thrown to an exception handler for processing. Otherwise, the class loader 107 generates the in-memory representation of the class by allocating the run-time constant pool 304, method code 305, and field and method data 306 for the class within the per-class area 303.

In some embodiments, when the class loader 107 loads a class, the class loader 107 also recursively loads the super-classes of the loaded class. For example, the virtual machine 104 may ensure that the super classes of a particular class are loaded, linked, and/or initialized before proceeding with the loading, linking and initializing process for the particular class.

During linking, the virtual machine 104 verifies the class, prepares the class, and performs resolution of the symbolic references defined in the run-time constant pool 304 of the class.

To verify the class, the virtual machine 104 checks whether the in-memory representation of the class is structurally correct. For example, the virtual machine 104 may check that each class except the generic class Object has a superclass, check that final classes have no sub-classes and final methods are not overridden, check whether constant pool entries are consistent with one another, check whether the current class has correct access permissions for classes/fields/structures referenced in the constant pool 304, check that the virtual machine 104 code of methods will not cause unexpected behavior (e.g. making sure a jump instruction does not send the virtual machine 104 beyond the end of the method), and so forth. The exact checks performed during verification are dependent on the implementation of the virtual machine 104. In some cases, verification may cause additional classes to be loaded, but does not necessarily require those classes to also be linked before proceeding. For example, assume Class A contains a reference to a static field of Class B. During verification, the virtual machine 104 may check Class B to ensure that the referenced static field actually exists, which might cause loading of Class B, but not necessarily the linking or initializing of Class B. However, in some embodiments, certain verification checks can be delayed until a later phase, such as being checked during resolution of the symbolic references. For example, some embodiments may delay checking the access permissions for symbolic references until those references are being resolved.

To prepare a class, the virtual machine 104 initializes static fields located within the field and method data 306 for the class to default values. In some cases, setting the static fields to default values may not be the same as running a constructor for the class. For example, the verification process may zero out or set the static fields to values that the constructor would expect those fields to have during initialization.

During resolution, the virtual machine 104 dynamically determines concrete memory address from the symbolic references included in the run-time constant pool 304 of the class. To resolve the symbolic references, the virtual machine 104 utilizes the class loader 107 to load the class identified in the symbolic reference (if not already loaded). Once loaded, the virtual machine 104 has knowledge of the memory location within the per-class area 303 of the referenced class and its fields/methods. The virtual machine 104 then passes control to the link resolver 114 which replaces the symbolic references with a reference to the concrete memory location of the referenced class, field, or method. For example, the link resolver 114 may consult metadata, tables, or other information to search and locate the concrete memory location. In an embodiment, the link resolver 114 caches resolutions to be reused in case the same class/name/descriptor is encountered again during execution of the program. In some embodiments, caching is performed by replacing the symbolic reference within the run-time constant pool 304 of the class. However, in other embodiments, a separate caching data structure is used to store pointers to the concrete memory location.

In some embodiments, the step of resolving the symbolic references during linking is optional. For example, an embodiment may perform the symbolic resolution in a "lazy" fashion, delaying the step of resolution until a virtual machine instruction that requires the referenced class/method/field is executed.

During initialization, the virtual machine 104 executes the constructor of the class to set the starting state of that class. For example, initialization may initialize the field and method data 306 for the class and generate/initialize any class instances on the heap 302 created by the constructor. For example, the class file 200 for a class may specify that a particular method is a constructor that is used for setting up the starting state. Thus, during initialization, the virtual machine 104 executes the instructions of that constructor.

In some embodiments, the virtual machine 104 performs resolution on field and method references by initially checking whether the field/method is defined in the referenced class. Otherwise, the virtual machine 104 recursively searches through the super-classes of the referenced class for the referenced field/method until the field/method is located, or the top-level superclass is reached, in which case an error is generated.

3.0 Storage Locations

Since different ABIs may have drastically different rules for passing variables between a caller and a callee and may utilize many different types of memory locations (e.g. general purpose registers, vector registers, stack slots, heap space, etc.), embodiments define memory constructs in a generic format. Thus, the term "storage location" is used herein to represent a generic structure that is used to store values for variables found within a computer program.

In some embodiments, when calling a function, the arguments are placed in certain "storage locations" as prescribed by the ABI. In many currently used ABIs, this includes a set of named registers and/or buffer space allocated from the stack, heap, or other arbitrary memory location. A storage location may be referenced as a combination of "storage category" (alternatively "storage class") and an index into the storage category.

The meaning of the index may change depending on the storage category to which the index is applied. For example, in the case of registers, which are typically limited in terms of number, the index may represent an identifier of a register of the associated storage category and the order of the indexes may represent the order in which registers are filled in according to the target ABI. For example, if a CPU has five general purpose registers named RegA, RegB, RegC, RegD, and RegE respectively, and the ABI for hardware intrinsics of the CPU specifies that the registers should be populated in the order previously presented, index 1 may correspond to the register RegA, index 2 may correspond to the register RegB, and so forth. As another example, in case of storage into a slot allocated on the stack or the heap, the index may represent an offset from a pointer representing the start of the allocated space. For example, each index could be implicitly assumed to represent a specific number of bytes or other unit of storage, such as 8 bytes. Thus, the index could represent the number of 8 byte chunks that need to be skipped over starting at the pointer in order to reach a particular storage location. However, the exact number of bytes represented by each increment of the index may be dependent on the target ABI/calling convention and could vary across different embodiments.

In some cases, ABIs may require the caller to specify a memory location where the arguments are stored prior to execution and/or where a return value will be stored after execution, which may be of arbitrary size. Depending on the embodiment, the aforementioned memory location may be a temporary storage space carved out of the stack, or may be placed in an entirely different memory structure, such as a heap.

The exact location used to allocate the temporary storage is not critical, unless otherwise specified by the target ABI. In such cases, embodiments include a storage category which corresponds to a "buffer" which can be populated with arguments to pass to the callee and/or used to return values back to the caller. In an embodiment, each buffer that is defined corresponds to a particular "label", which represents the effective base address of the buffer. For example, the label may correspond to a pointer that points to the memory location of where the buffer begins. In some embodiments, during processing of a certain mapping, the labels are maintained in a queue. When a buffer is created, its label is placed at the end of the queue. If a buffer label is passed as an argument, the label is removed from the start of the queue. For example, the ABI may specify that a pointer to the label is to be stored in a particular register. Thus, when the aforementioned register is to be populated, the label can be pulled into the register to pass the location of where the buffer is stored to the callee. The buffer category in some embodiments may be split into a stack category and a heap category, with the term "buffer" being used as an umbrella term that covers both the stack and heap categories.

4.0 Adapter Generation General Process Flow

The adapter component may be implemented in a multitude of different ways. In some embodiments, the operating environment (such as the virtual machine 104) implements one generic adapter that is applicable to all cross-ABI calls. In such cases, the adapter takes as input or utilizes metadata that describes factors and/or rules for how the target ABI expects variables to be laid out in memory. For example, the storage categories that the target ABI utilizes, identifiers for storage locations within each storage category (for example, register names, byte increments to use for a buffer index, and so forth), order in which locations within each storage category should be populated, the argument and/or return types that map to particular storage categories, whether certain storage locations will be preserved across the call, a prescribed storage location for a stack pointer, whether use of certain storage locations are mutually exclusive with other storage locations (for example, ABIs currently exist where use of a vector register requires a corresponding general purpose register to remain unused), storage locations that must be left open or allocated for the callee to place return values, and so forth. The adapter, based on the metadata and the specified argument/return types, includes code specifying how to shape memory constructs which correspond to the specified argument/return types to adhere to the target ABI. The code that governs the transformation of the memory structures holding the arguments is referred to as "prolog code" and the code that governs the transformation of memory structures holding the return value(s) is referred to as "epilog code".

As an optimization, some embodiments may include an "adapter generator", which is a component that takes as input the argument/return types and metadata describing the target ABI, generates an adapter that can convert memory structures holding the arguments to adhere the target ABI and memory structures which hold the return value(s) to adhere to the source ABI, and then produces as output one or more executable references (such as a MethodHandle in Java) to the adapter. For a given shape of the call (argument and return types) and metadata defining the target ABI, the instructions required to populate the memory structures which adhere to the target ABI remain constant regardless of the actual values which are passed during the call and/or the actual set of native instructions which are invoked by the call. As a result, the generated adapter can be stored and reused whenever a call of the same shape is used to access a set of native instructions adhering to the same target ABI. In addition, the instructions which comprise the adapter can be slimmed down to omit many of the pre-processing steps that would otherwise be performed to generate the prolog and/or epilog instructions. An example of a reference which utilizes a library of stored adapters is described by Click Jr. et al, "Automatic Adapter/Stub Generator", U.S. Pat. No. 6,381,737, which is hereby incorporated by reference as though fully stated herein. Furthermore, in some embodiments, the prolog code and epilog code may be compiled and the resultant machine code stored in a library or cache for later use, bypassing most of the steps the virtual machine 104 may otherwise have to perform. Instead, the virtual machine 104 can execute the stored machine code to perform the necessary prolog and epilog processing for the call after making a determination that an appropriate executable adapter is already available.

The metadata describing the target ABI, and thus the process flow of the adapter, depends heavily on the target ABI of the set of native instructions ("native method") that is being called. However, there are some steps performed by the adapter that may be consistent regardless of the target ABI. In some embodiments, in order to ensure sufficient space on the stack and/or heap is allocated, the adapter inspects the types of the arguments and returns and determines the total amount of space that will be needed for each storage category. The space determination may be based on the metadata describing the ABI and/or limitations of the underlying hardware, such as the number of locations available in each storage category. For example, assume four general purpose registers are available and the target ABI defines a rule that integers are stored in general registers with overflow onto a buffer, which will be assumed to be allocated on the stack for the purpose of this example. If the call has six integer arguments, the adapter can determine that four of the integers can be placed within registers, but two of the integers will have to be spilled onto the stack. The adapter could then emit instructions specifying to the interpreter 108 and/or JIT compiler 109 to pre-allocate the stack with space for two integers. The same logic can also apply to the case of buffers allocated on the heap or any other storage category whose locations can be pre-allocated. Thus, depending on the rules of the target ABI and the number of storage locations available in each class, the virtual machine 104 can determine which allocations need to be made in which storage categories. However, in some cases the interpreter 108 and/or JIT compiler 109 performs the aforementioned determinations instead of the adapter. In most cases, code to handle potential spillover will be required for any ABI which utilizes "bounded" storage categories (categories with storage locations which are limited in number) to cover cases where the number of arguments which would otherwise be placed in the storage category would exceed said number.

In some cases, the target ABI may specify that certain types of arguments are to be stored in a buffer (e.g. on the stack or heap) without attempting to place those values into registers first. In such cases, the adapter generator can ensure that sufficient space has been allocated in the specified storage category to store values corresponding to the aforementioned argument types. Furthermore, in the case of return values, the target ABI might specify that certain space in a buffer needs to be allocated and passed in as a pointer so that the return value that result(s) from executing the native method can be stored in that space. In such cases, the storage space for the return values can be allocated in the same manner as for argument spillover described above. Although the term "buffer" has been referred to a single category, a target ABI may in fact define multiple buffer categories. For example, one buffer category for storing spillover arguments and another for storing return value(s). Each may have its own corresponding label that is passed to the native method by a respective register. Alternatively, one label may be used to buffer space and the arguments and/or return values may be placed in different locations within that same buffer. The format used will depend on how the callee expects the memory structures holding those values to be configured.

In an embodiment, the adapter generator 115 represents software, hardware, or a component implemented using a combination of software and hardware that generates an adapter for converting memory structures between the ABI of the virtual machine 104 and the ABI of a program or target set of instructions that adheres to a different ABI than the virtual machine 104.

In some embodiments, the adapter generator 115 generates instructions representing the memory manipulations that need to be performed to convert memory constructs from the format expected by the source ABI (ABI of the virtual machine 104) to the format expected by the target ABI (ABI of the native method). The instructions generated by the adapter generator 115 may take the form of machine code that can be executed by one or more processor(s) of the underlying computing architecture 100 or may take the form of intermediate instructions which can then be passed to the interpreter 108 and/or the JIT compiler 109 for conversion into executable machine instructions. In order to provide clear examples, the description below assumes that the instructions generated by the adapter generator 115 are intermediate instructions, but this is not a requirement for all embodiments.

FIG. 5A illustrates a general process for generating intermediate instructions representing the prolog and epilog code of an adapter.

In FIG. 5A, the adapter generator 115 receives a call shape 500 from the virtual machine 104. For example, the virtual machine 104 upon receiving an instruction to perform a native call may invoke the adapter generator 115 and pass the return types 507 and argument types 506 of the call to the adapter generator 115. In addition, the adapter generator 115 receives an ABI identifier 501 that identifies the target ABI. In some embodiments, the ABI identifier 501 is used to locate metadata that describes how the variables in memory represented by the call shape 500 should be laid out in memory so as to adhere to the target ABI. For example, the ABI identifier 501 may be used to perform a branch within the logic of the adapter generator 115 that apply the rules associated with the target ABI for performing the conversion of the memory structures. The source ABI is assumed to be the ABI of the virtual machine 104 or if the virtual machine 104 uses multiple ABIs, the ABI used by the method that invoked the native call. In other embodiments, the ABI identifier 501 is used to locate logic, in the form of a method or other set of instructions, which applies the rules of the target ABI to the argument types 506 to determine which argument types 506 will be placed in which storage locations.

The adapter generator 115, based on the call shape 500 and the ABI identifier 501, generates a raw adapter 505 which includes prolog code 502 and epilog code 503. The prolog code 502 represents instructions which causes the virtual machine 104 to convert the memory structures holding the arguments to the native call from the format of the source ABI to the format of the target ABI. For example, one or more values may be popped off the operand stack 402 of the frame 400 of the method making the native call and placed in various registers as dictated by the target ABI. The epilog code 503 represents instructions which causes the virtual machine 104 to convert the memory structures holding the return types from the format of the target ABI back into the format of the source ABI. For example, the native instructions may have left the return value in memory on the heap and the conversion may be performed by pushing a reference to the return value onto the operand stack 402 of the frame 400 of the method that made the native call. In some memory models the return is only allowed to be one value. However, other embodiments may allow for multiple return values to be returned to the callee. In some embodiments, at the end of FIG. 5A, the prolog code 502 and the epilog code 503 of the raw adapter 505 are represented using intermediate instructions which are useful for generalizing the operations across all computer architectures, rather than machine instructions which can actually be executed by the computing architecture 100.

In some embodiments, the adapter generator 115 may be specialized to produce a raw adapter 505 only for a particular ABI. In such embodiments, the ABI identifier 501 may be omitted. Furthermore, some embodiments may use multiple adapter generators that are each specialized to a particular ABI. Thus, rather than the ABI identifier 501 being passed in, the virtual machine 104 may be configured to invoke the particular adapter generator that is specialized to the ABI of the native method referenced by the call.

FIG. 5B illustrates a general process for converting a raw adapter that includes prolog code and epilog code represented using an intermediate instruction set into an executable adapter and caching the executable adapter according to an embodiment.

In FIG. 5B, the raw adapter 505 is passed into the interpreter 108 and/or JIT compiler 109, which then convert the raw adapter 505 into executable adapter 504. The process performed by the interpreter 108 and/or JIT compiler 109 converts the prolog code 502 of the raw adapter 505 into executable prolog code 509, which represents the machine instructions which can be executed by the underlying computer architecture 100 to perform the memory manipulations required to convert the memory representation of the argument types 506 from that of the source ABI to that of the target ABI. In addition, the process performed by the interpreter 108 and/or JIT compiler 109 converts the epilog code 503 of the raw adapter 505 into executable epilog code 510, which represents the machine instructions which can be executed by the underlying computer architecture 100 to perform the memory manipulations required to convert the memory representation of the return types 507 from that of the target ABI to that of the source ABI. In order to complete the native call, the virtual machine 104 executes the executable prolog code 509 of the executable adapter 504 to convert the memory structures holding the arguments to the format expected by the target ABI, invokes the native method, and then executes the executable epilog code 510 of the executable adapter 504 to convert the memory structures holding the return values into the format expected by the source ABI. In an embodiment, the ABI identifier 501 that identifies the target ABI is also passed to the interpreter 108 and/or JIT compiler. For example, the interpreter 108 and/or JIT compiler 109 may need to know the order in which to process the different storage categories. Since the storage categories which are available may differ across different ABIs, the ABI identifier 501 may be used to look up the order for the target ABI of the native call.

However, although the native call can be completed after the executable adapter 504 is generated, the entire process may have to be repeated again each time a native call is made, even when the call shape 500 is the same between the native calls. As a result, some embodiments include an adapter cache 116 into which the virtual machine 104 places the executable adapter 504. The adapter cache 116 includes the executable form of the adapters generated previously by the adapter generator 115 and an index 508 which associates each cached adapter with the call shape 500 and ABI identifier 501 which generated that adapter. As a result, when a native call is performed by the virtual machine 104, the virtual machine 104 first checks the adapter cache 116 to see if the index 508 includes an entry that identifies the call shape 500 and ABI identifier 501 of the current native call. If so, the virtual machine 104 can then execute the executable prolog code 509 and executable epilog code 510 of the executable adapter 504 found in the cache, rather than invoking the adapter generator 115 to generate a new adapter. If an entry for the call shape 500 and the ABI identifier 501 does not exist in the adapter cache 116, the general technique described above can then be used to generate the executable adapter 504 and store the executable adapter 504 in the adapter cache 116 for later use.

In some embodiments, the virtual machine 104 may only use the JIT compiler 109 or only use the interpreter 108 to generate the executable adapter 504. One advantage to using the interpreter 108 over the JIT compiler 109 is that the initial execution of the native call will generally be faster. However, since the interpreter 108 reads instructions and performs the conversion instruction-by-instruction, there is less opportunity to perform optimizations over the instructions contained within the raw adapter 505. Furthermore, there may not be a mechanism available to capture the machine code instructions issued by the interpreter 108 which could possibly prevent the executable adapter 504 from being stored in the adapter cache 116 for later use. Instead, in such situations, the raw adapter 505 could be cached instead. This caching process would prevent the need to regenerate the raw adapter 505 for native calls sharing a call shape 500 and ABI identifier 501, but the cached instructions would then need to be passed to the JIT compiler 109 or the interpreter 108 for conversion into executable machine instructions. Some embodiments may take a hybrid approach where the instructions of the raw adapter 505 are first interpreted, but after a threshold number of native calls have been made which use the same call shape 500 and ABI identifier 501, the raw adapter 505 is then compiled and the resulting executable adapter 504 may then be cached and re-used from that point forward.

5.0 Example Adapter Instruction Set

In an embodiment, the raw adapter 505 includes prolog code 502 and epilog code 503 that exist in an intermediate form that is not executable, but is instead generalizable to virtually any type of computer architecture. The instructions perform memory manipulations that explain how to map memory structures representing variables (such as arguments and returns) from the format of one ABI to another.

In an embodiment, the instructions which comprise the raw adapter 505 are drawn from the following set of instructions: (1) NOP—do nothing, (2) STOP—proceed to next storage class, reset the index, (3) SKIP—skip the current storage location, increase the index, (4) PULL—fill the current storage location, increase the index, (5) CREATE_BUFFER—create a buffer (e.g. on the stack or heap), add its effective address (label) to a stack, list or queue, and (6) PULL_BUFFER_LABEL—fill the current storage location with the next label from the stack, list or queue. In some embodiments, the CREATE_BUFFER instruction is appended with additional data, such as a number of bytes that indicates how large the created buffer should be. In addition, the STOP instruction may include additional data that specifies the next storage category to process. The index referred to by the aforementioned instructions is the index into the storage locations within the storage category currently being processed. In an embodiment, the interpreter 108 and/or JIT compiler 109 iterates through the storage locations of the current storage category then advances to the first index of the next storage category being processed.

These aforementioned instructions provide the building blocks for the memory manipulations required to adhere to virtually any of the currently known ABIs and is generic enough to be applied to virtually any ABI that may be developed in the future. Thus, given a call shape 500 and the ABI identifier 501, some combination of the aforementioned instructions can be produced by the adapter generator 115 which can handle the passing and returning of values in accordance with virtually any ABI. These instructions, when interpreted by the interpreter 108 or compiled by the JIT compiler 109, produce machine instructions for the underlying computer architecture 100 which implement the effect associated with each of the aforementioned instructions. However, the exact instructions produced at the machine-code level is heavily dependent on the underlying computer system and will vary from embodiment to embodiment. For example, the virtual machine 104 may store mappings from the aforementioned instructions to corresponding machine code instructions which implement the appropriate effect on the memory structures. Thus, a component such as the interpreter 108 or the JIT compiler 109 can then use such mappings to mechanically translate the intermediate instructions to the machine-level instructions that can actually be executed by one or more processors of the computing architecture 100.

6.0 Example Calling Convention Rules

In an embodiment, the ABI identifier 501 is mapped by the adapter generator 115 to a set of rules which describes how to transform the arguments types 506 into the format expected by the target ABI and how to transform the return types 507 back into the format expected by the source ABI. The aforementioned set of rules is referred to as "calling convention rules". In some embodiments, the calling convention rules are implemented by logic comprising one or more instructions which, when executed by the virtual machine 104, maps a given call shape 500 onto various storage locations within the storage categories supported by the target and source ABIs. For example, the calling convention rules may be implemented by logic and a reference to that logic may be passed into the adapter generator 115 or looked up by the adapter generator 115 and invoked to assist in producing the raw adapter 505. In this example, different bundles of logic may be stored by the virtual machine 104 for different ABIs which are passed by reference as the ABI identifier 501 to the adapter generator 115 based on the target ABI of the native call. However, in other embodiments, the rules may be encoded using identifiers or metadata representing the various aspects of the format expected by the target ABI and used by the logic of the adapter generator 115 to produce the raw adapter 505.

In some embodiments, the calling convention rules are hand-coded to be specific to each ABI supported by the virtual machine 104 for native calls. For example, a programmer may read a document that describes the target ABI and then encode the calling convention rules for that target ABI as metadata or logic used by the adapter generator 115.

In an embodiment, the calling convention rules identify the storage categories adopted by the target ABI. For example, the calling convention rules may identify one or more storage categories such as, 32-bit registers, 64-bit registers, general purpose registers, data registers, vector registers, floating point registers, buffer memory locations (e.g. allocated on the stack or heap), and so forth. In addition, the calling convention rules may also identify which types belonging to the type system of the virtual machine 104 are mapped onto which storage categories of the target ABI. For instance, the calling convention rules may divide out the types known to the virtual machine 104 and assign each type to a respective storage category of the target ABI. Furthermore, for storage categories that are limited in number, such as registers, the calling convention rules may specify for each storage category an overflow storage category to be used when the primary storage category is full. For instance, if the maximum number of vector registers have already been assigned within the vector register storage category, the remaining vectors may be stored within a buffer with a label signifying the starting position being passed through the first available general purpose register. Furthermore, the same mappings may also be used to map the storage categories that the return types 507 have been placed in by the native method back to the types available within the source ABI/type system of the virtual machine 104. The storage categories utilized by the target ABI and the mappings between types recognized by the virtual machine 104 and the storage categories of the target ABI may differ for different ABIs. Thus, although various specific examples of calling convention rules and types of storage categories are described herein, the techniques described herein are applicable broadly enough to cover virtually any ABI.

The calling convention rules may specify, but are not limited to, the storage categories that the ABI utilizes, identifiers for storage locations within each storage category (for example, register names, byte increments to use for a buffer index, etc.), order in which locations within each storage category should be populated, the argument and/or return types of the virtual machine 104 that map to particular storage categories of the target ABI, whether certain storage locations will be preserved across the call, a prescribed storage location for a stack pointer, whether use of certain storage locations are mutually exclusive with other storage locations (for example, calling conventions currently exist where use of a vector register requires a corresponding general purpose register to remain unused), designated registers to hold addresses for variables stored in buffers, storage locations designated to be left open or allocated to accept return values generated by the native method, and so forth.

In some embodiments, the adapter generator 115 could be considered as combining "ABI specific" rules with "ABI generic" rules to produce a raw adapter 505 describing the mapping of the arguments/returns of a call to the appropriate storage locations and categories in memory. Examples of "ABI specific" rules could be the types of information described above with respect to the calling convention rules that the adapter reads to determine how to process the memory structures of the variables for the target ABI. For example, ABI specific rules may include the storage categories available to the ABI, mutually exclusive storage locations within the storage categories defined by the ABI, step sizes used for the index for specific storage categories, and so forth. ABI specific rules are thus the rules the adapter utilizes that are specific to a particular ABI. ABI generic rules are those rules which apply to any ABI that could be targeted, regardless of the specifics of that ABI. For example, as explained in more detail below, sorting the variables by their associated storage categories has benefits that are generally applicable to any target ABI. As another example, ABI generic rules may include a rule where referenceable storage categories are processed before the storage categories which could potentially store references to the storage locations within the referenceable categories. The aforementioned rule ensures that at most only one pass over the storage locations within each category would have to be performed to generate the raw adapter 505, rather than jumping out to allocate and create a label to a memory location and jumping back to pull the label into another storage location. However, even though there are rules that are generally applicable, there is no requirement that an embodiment has to incorporate the generally applicable rules.

There are also examples of rules which may be ABI specific or ABI generic depending on the implementation of the adapter generator 115. For example, presently most ABIs agree on the underlying step sizes for certain storage categories, such as the basic size of information blocks that could be indexed. Thus, while in some embodiments the metadata may specify a step size for each increment of the index for the various storage categories, other embodiments may hard code or otherwise assume that the step size for certain storage classes (e.g. buffers, etc.) will be consistent across the platforms. As another example, the argument/return types that are mapped to a particular storage category could either be ABI specific (e.g. described by the calling convention rules as mapped to a specific storage category) or ABI generic (e.g. the adapter could assume that if a particular storage category is available on the target ABI, one or more specific types of arguments/returns would always be mapped to that storage category). Thus, in some embodiments the adapter could be considered as functioning by combining the ABI generic rules with ABI specific rules, such as combining the generic functionality of the adapter with the specific ABI rules defined by the calling convention rules, to produce the intermediate instructions of the raw adapter 505.

7.0 Native Call Process Flow

Figure 6:
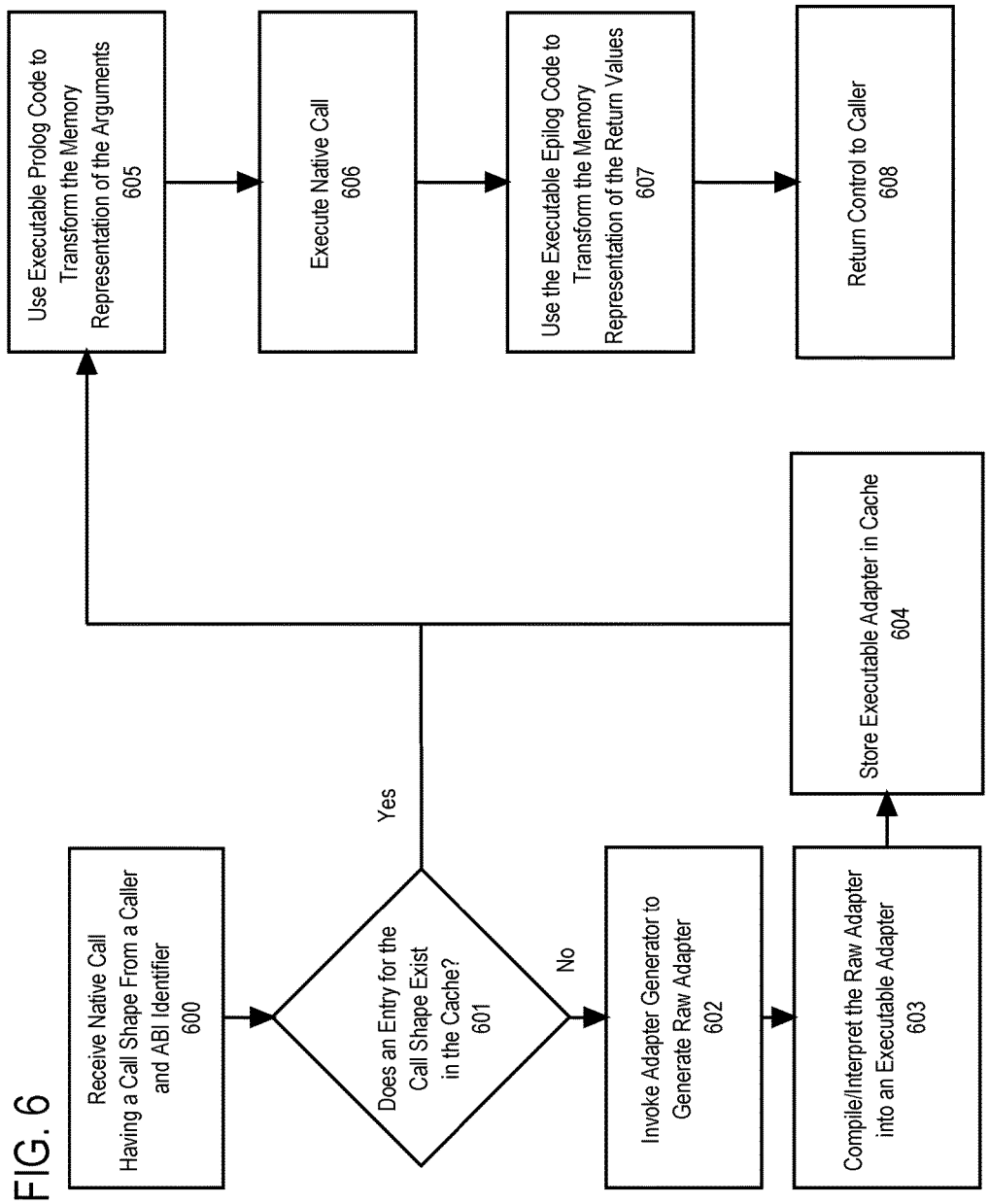
FIG. 6 illustrates an example process flow for executing a native call in block diagram form according to an embodiment.

FIG. 6 illustrates an example process for performing a native call in block diagram form according to an embodiment. In order to illustrate clear examples, the following explanation assumes that the process flow of FIG. 6 is performed by virtual machine 104. Although the illustration of FIG. 6 depicts a specific number of steps performed in a particular order, other embodiments may reorder the steps, break the steps down into multiple sub-steps, combine steps, add steps, or remove steps compared to FIG. 6. Furthermore, in other embodiments, the steps may be performed by different actors, such as moving the steps of checking the adapter cache 116 from the virtual machine 104 to the adapter generator 115. In some embodiments, the process flow of FIG. 6 is performed by executing software instructions which cause one or more processors of the computing architecture 100 to perform the recited steps. However, in other embodiments, the steps may also be implemented by hardware or using a combination of hardware and software.

A "native call" is defined as a call from a method to another method which operates under a different ABI. The method invoked by the native call is referred to as the "native method". The method which invokes the native method, is referred to as the "calling method".

In FIG. 6, at block 600, the virtual machine 104 receives an instruction specifying to perform a native call having call shape 500, including argument types 506 and return types 507. In an embodiment, the virtual machine 104 receives the native call from a calling method. For example, the virtual machine 104 may receive a special bytecode instruction from the calling method that specifies a native call is being made or the bytecode instruction may reference metadata, such as one or more entries of the run-time constant pool 304 of the class hosting the calling method, which identifies the call as being to a native method.

As discussed above in reference to FIG. 3 and FIG. 4, a call from one method to another is ordinarily performed by the calling method putting the arguments for the call onto the operand stack 402 of its stack frame 400 and then issuing a bytecode instruction that identifies which method is being invoked. The instruction then causes a new frame to be placed on the virtual machine stack 310 of the thread executing the calling method, the new frame having local variables corresponding to the argument types of the call. However, native calls are made when the instructions or program being executed adheres to an ABI that is different than the ABI to which the calling method adheres. Thus, if the native call were to be performed as normal, the executed instructions of the native method may not know how the arguments are stored and therefore the execution would likely cause an error to occur. As a result, the virtual machine 104 needs to convert the memory representation of the arguments from the format expected by the ABI of the calling method (e.g. variables on the operand stack 402), to the memory format expected by the ABI of the native method.

At block 601, the virtual machine 104 determines whether the adapter cache 116 already has an entry that maps the call shape 500 of the native call and the ABI identifier 501 that corresponds to the ABI of the native method to a previously generated executable adapter 504. For example, the virtual machine 104 may consult the index 508 of the adapter cache 116 to determine whether an applicable adapter already exists. In response to a determination that the executable adapter 504 already exists within the adapter cache 116, the virtual machine 104 proceeds to block 605. Otherwise, the virtual machine 104 proceeds to block 602. However, for embodiments that implement a cache of the raw adapters rather than executable adapters, a determination that the adapter cache 116 does have an appropriate entry would instead cause the virtual machine 104 to proceed to block 603 to perform the convention of the raw adapter 505 into an executable adapter 504 and skip over block 604.

At block 602, the virtual machine 104 invokes the adapter generator 115 to generate raw adapter 505. In an embodiment, the virtual machine 104 identifies the call shape 500 of the native call (argument types 506 and return types 507 of the call) and the ABI identifier 501 of the native method. For example, the instruction received by the virtual machine 104 at block 600 may reference an entry in the run-time constant pool 304 of the class hosting the calling method that defines the call and which identifies the call shape 500 and the ABI identifier 501 of the native method either directly or by referencing one or more other entries of the run-time constant pool 304.

However, in other embodiments, the entry in the run-time constant pool 304 may not identify the ABI identifier 501 of the native method. Instead, the native method may be defined under a hosting class which identifies the call shape 500 and maps the call shape 500 to the ABI identifier 501 and a memory location where the instructions comprising the native method may be located. In such embodiments, the virtual machine 104 may use the definition of the call in the constant pool of the class hosting the calling method to locate the associated class file 200 or per-class area 303 of the class hosting the native method (depending on whether the class hosting the native method has already been loaded), load the class hosting the native method (if necessary), and then locate the appropriate entry in the constant pool of class hosting the native method that matches the call shape 500 and/or ABI identifier 501.

After the call shape 500 and the ABI identifier 501 are identified, the adapter generator 115 is invoked to generate raw adapter 505. The steps performed by the adapter generator 115 are described in more detail below in Section 7.0 and Section 8.0. The result of invoking the adapter generator 115 is the raw adapter 505 which includes the prolog code 502 and the epilog code 503 that describe how to convert the arguments and return types from one memory representation to the other.

At block 603, the virtual machine 104 compiles/interprets the prolog code 502 and epilog code 503 of the raw adapter 505 into the executable adapter 504. In an embodiment, the virtual machine 104 compiles the prolog code 502 and the epilog code 503 into executable prolog code 502 and executable epilog code 510 by invoking the JIT compiler 109. However, as discussed above in Section 3.0, alternative embodiments may instead use the interpreter 108 to convert the prolog code 502 and the epilog code 503 into executable instructions, or may use a combination of the interpreter 108 and the JIT compiler 109.

At block 604, the virtual machine 104 stores the generated executable adapter 504 in the adapter cache 116 and updates the index 508 of the adapter cache 116 to include an entry for the call shape 500 and ABI identifier 501. As a result, the next time the executable adapter 504 is needed for the same call shape 500 and ABI identifier 501, the steps represented by blocks 602-604 may be skipped based on the determination at block 601.

At block 605, the virtual machine 104 uses the executable prolog code 509 of the executable adapter 504 to transform the memory representation of the arguments of the native call from the format of the source ABI to the format of the target ABI. In an embodiment, the executable prolog code 502 of the executable adapter 504 is represented by machine instructions which may be executed by one or more processors of the computing architecture 100 to transform the memory structures holding the arguments into the format expected by the target ABI. For example, the prolog code 502 may specify to pop off one or more values off the operand stack 402 of the calling method and to insert those values into one or more registers, memory locations on the stack, memory locations on the heap, and so forth and the executable prolog code 509, when executed by one or more processors of the computing architecture 100, causes that effect. The result at the end of block 605 is that the arguments of the native call have been transformed in memory to reside in structures following the format expected by the target ABI.

At block 606, the virtual machine 104 executes the native call. In some embodiments, the native method has a definition that is hosted by a particular class, where the definition maps between the call shape 500 of the native method and the memory location where the instructions comprising the native method reside. Thus, to execute the native call, the virtual machine 104 performs the aforementioned mapping and executes the located instructions. As a result of executing the instructions, the native method returns a result. However, that result is stored in the format of the target ABI, rather than that of the source ABI. Thus, if control were to be returned to the calling method, there is no guarantee that the return would be in the expected location on the operand stack 402. In cases where the native method has no return, such as a method with return type of "void", there may be no epilog code generated for the executable adapter 504 and the virtual machine 104 may skip the step at block 607.

At block 607, the virtual machine 104 uses the compiled epilog code 503 of the executable adapter 504 to transform the memory representation of the return of the native call from the format of the target ABI to the format of the source ABI. In an embodiment, the executable epilog code 510 of the executable adapter 504 is represented by machine instructions which may be executed by one or more processors of the computing architecture 100 to transform the memory structures holding the return from the format of the target ABI to the format of the source ABI. For example, the result may be returned on the heap and therefore the virtual machine 104 would ensure that a reference to the return value has been pushed back onto the appropriate storage location on the operand stack 402. As another example, the same result may map to a primitive type in the ABI of the virtual machine 104 and therefore may need to be pushed by value onto the operand stack 402, rather than by reference.

At block 608, control is returned to the calling method. In an embodiment, at block 608, the arguments have been popped off of the operand stack 402 and the return value(s) have been placed onto the operand stack 402 by value or reference depending on type. As a result, the virtual machine 104 can return to executing the bytecode instructions of the calling method with the memory structures in their proper place as expected by the source ABI of the calling method.

In some embodiments, the virtual machine 104 generates the raw adapter 505 and/or executable adapter 504 ahead of the native call. For example, the native calls may be defined within one or more hosting classes that identifies the call shape, name, and other characteristics of the native calls supported by the virtual machine 104. Since the instructions comprising the raw adapter 505 and/or executable adapter 504 are independent of the actual values passed in for the types identified by the call shape, this allows the virtual machine 104 to generate the raw adapter 505/executable adapter 504 ahead of time for storage in the cache 115. Thus, when a native call matching a pre-generated adapter is performed, the adapter can be retrieved from the cache while skipping many of the steps depicted in FIG. 6.

8.0 Adapter Generator Prolog Process Flow

Figure 7:
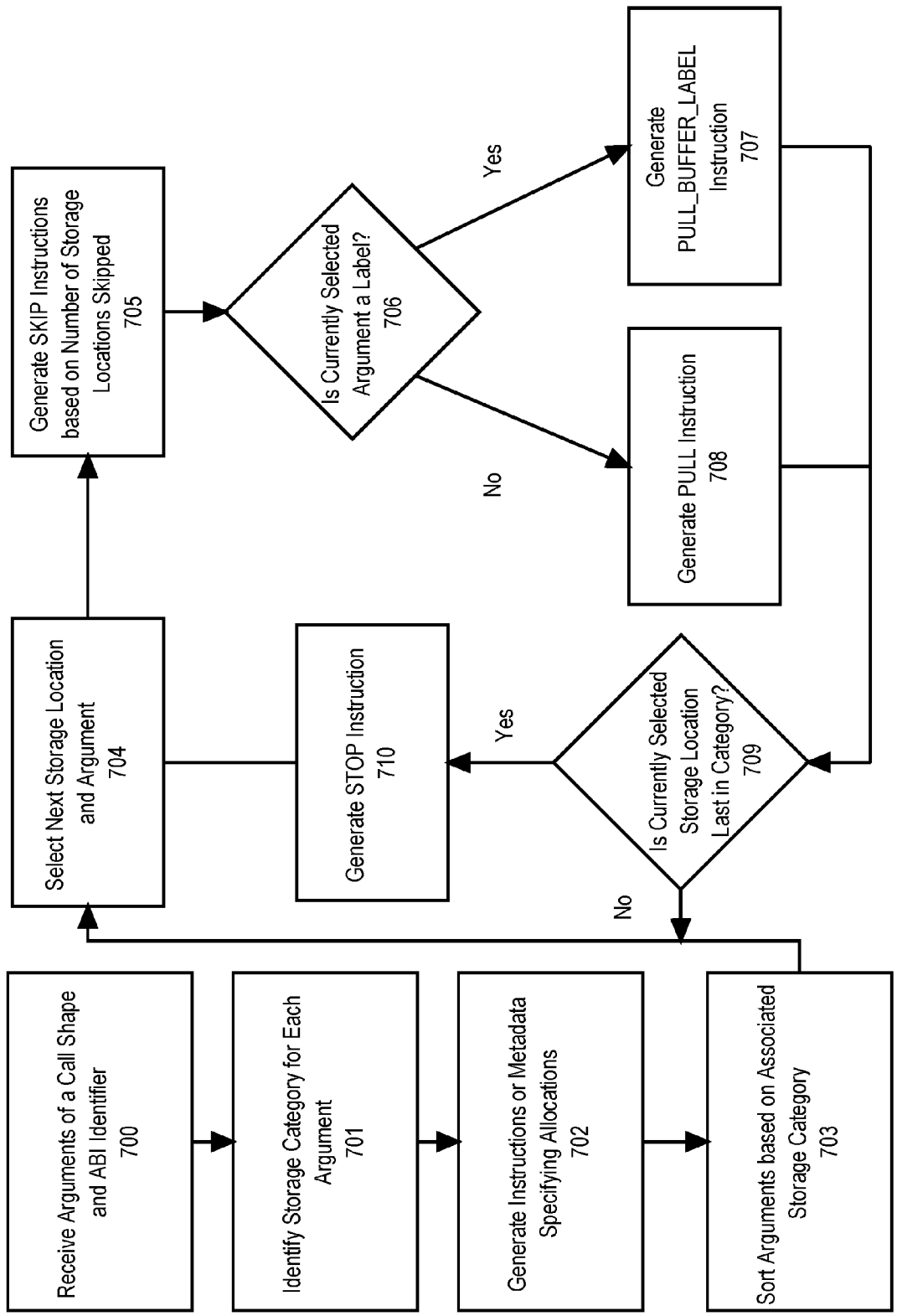
FIG. 7 illustrates an example process flow for generating prolog code of an adapter in block diagram form according to an embodiment.

FIG. 7 illustrates an example process for generating prolog instructions for an adapter according to an embodiment. In order to illustrate clear examples, the following explanation assumes that the process flow of FIG. 7 is performed by adapter generator 115. Although the illustration of FIG. 7 depicts a specific number of steps performed in a particular order, other embodiments may reorder the steps, break the steps down into multiple sub-steps, combine steps, add steps, or remove steps compared to FIG. 7. Furthermore, in other embodiments, the steps may be performed by actors other than the adapter generator 115. In some embodiments, the process flow of FIG. 7 is performed by executing software instructions which cause one or more processors of the computing architecture 100 to perform the recited steps. However, in other embodiments, the steps may also be implemented by hardware or a combination of hardware and software.

In FIG. 7, at block 700, the adapter generator 115 receives one or more argument types 506 of a call shape 500 and an ABI identifier 501 for the target ABI. In an embodiment, the adapter generator 115 receives the one or more argument types 506 of the call shape 500 and the ABI identifier 501 from the virtual machine 104 at block 602 of FIG. 6 as described above. In some embodiments, the adapter generator 115 receives the full call shape 500, including the argument types 507, instead of just the argument types 506. For example, receiving the full call shape 500 may facilitate the reservation of storage locations (such as specific registers and/or slots in a buffer) that will be used by the native method to place the return values for passage back to the calling method.

At block 701, the adapter generator 115 identifies the storage categories supported by the target ABI and the respective storage categories to which the one or more argument types 506 belong. In an embodiment, in response to receiving the ABI identifier 501, the adapter generator 115 consults metadata, such as a table, that maps types within the type system of the virtual machine 104 to their respective storage category. However, in some cases, the adapter generator 115 may erase the types of the one or more argument types 506 down to base types.

For example, in the type system of the JVM all object references erase down to a base reference type. Since each reference is the same size within the type system of the JVM, manipulation of the memory constructs storing those references, such as popping the reference off the operand stack 402 and placing the reference into a general purpose register is the same regardless of the size or type of the referenced object. Furthermore, in some ABIs different primitives within the type system of the virtual machine 104 may be classified using the same storage category. For example, a target ABI may map both integer types and floating point types to the same category of registers. Thus, unique types which share a common storage category may be "erased" by the adapter generator 115 down to a common type provided that the semantics of the memory manipulations required by the target ABI remain constant. Erasing down to base types also has some benefits with the adapter cache 116, since a variety of different call shapes which erase down to the same call shape 500 can use the same cached adapter.

Thus, at block 701, the adapter generator 115 has identified the storage category that each of the arguments is associated with in the target ABI. The storage category that the ABI prefers to put a particular type of argument into is referred to as the "primary storage" category of the argument type. In addition to a primary storage category, each of the primary storage categories may be associated with a "spillover" storage category that is used when the primary storage category is full or otherwise unavailable. For example, integer types may be mapped to general purpose registers until there are no more available general purpose registers. At that point the target ABI may require the virtual machine 104 to allocate buffer space for the additional integer arguments and/or place a reference to the allocated buffer space into a register dedicated to holding a label to the buffer. While it may be preferable to place the argument values into their primary storage category, which is often a storage category designed for faster access (e.g. preferring a register over RAM storage), the spillover storage allows the virtual machine 104 to pass the full set of arguments to the native method even if the underlying computing architecture 100 cannot fully accommodate the arguments within the primary storage category. In most cases the primary storage category will be bounded (limited in number) and the spillover storage will be unbounded. For example, space on a buffer (such as stack and heap space) is considered to be unbounded storage, whereas registers are considered to be bounded storage. Although the term "unbounded" is used, this does not denote that the amount of storage in that category is actually unlimited. Instead, the term differentiates between storage which has a small set of discrete locations (such as registers) vs. storage which can be grown or allocated based on the number of arguments being passed in (such as space on the stack or heap).

In some embodiments, the adapter generator 115 identifies, within each primary storage category, which arguments can be placed into the primary storage category and which arguments will need to be placed in spillover storage. The adapter generator 115 then changes the storage category for the identified arguments to their spillover storage category. For example, assume that the target ABI has a calling convention rule that integers are to be placed into available general purpose registers with spillover onto a buffer. If there are more integer arguments to the native call than the general purpose registers can accommodate, the remainder of the integer arguments are identified as belonging to the spillover storage category, in this case placed into the buffer. The buffer may be allocated on the stack or on the heap, for the purpose of this example assume that the buffer is allocated from the stack. In this case, if there are six integer arguments to the native call and only three general purpose registers (GP1, GP2, GP3), the first three integers would be assigned to GP1, GP2, GP3 and the last three would be placed in slots on the stack (Stack+0, Stack+8, Stack+16). The previous example assumes that the buffer has slots of 8 bytes, but in practice the buffer can have slots of arbitrary sizes depending on the target ABI.

In some cases the ABI may state that a certain portion of the buffer is reserved for the return of the native call. As a result, continuing from the previous example, there is no requirement that the spillover storage start at storage location 0 of the stack. If the ABI required the first four slots of the stack to be left open, the last three arguments would instead be placed at (Stack+32, Stack+40, Stack+48). However, other embodiments may use separate buffers to hold arguments and return values. Furthermore, in some cases, a single argument may take up multiple stack slots. For instance, in the case of an argument list of {double, int, int} being placed on the stack, the double might be placed at Stack+0, but due to the size requirement for storing a double it may take up two 8 byte slots. Thus, the two integers would be pushed to Stack+16 and Stack+24 respectively. In some embodiments, when a portion of the stack needs to be left open, this will eventually be represented in the prolog code 502 generated by the adapter generator 115 by SKIP instructions. Furthermore, there is no requirement that the storage locations be contiguously assigned to the arguments. For instance, there are some ABIs that have storage locations which are mutually exclusive, such as requiring that when a vector register is used the corresponding general purpose register be left open. Thus, the data structure mapping the argument types 506 to storage locations may skip some storage locations depending on the requirements of the target ABI. This skipping will also eventually be represented using SKIP instructions as explained in further detail below.

In some embodiments, the adapter generator 115 adds one or more arguments to the list of arguments prior to performing the identification of the storage category assigned to each argument. For example, some ABIs require that a label to buffers be placed in At particular storage locations, such as particular general purpose registers. Thus, the adapter generator 115 may insert one or more additional arguments representing base memory addresses to the buffers to the list of arguments and assign those additional arguments to their respective storage locations in accordance with the target ABI. Furthermore, in some embodiments, the target ABI may specify that a stack pointer (representing a memory area where the native method can place local variables and temporaries) be provided in a specific register, which can also be inserted into the list of arguments for storage in the specified register. In some cases, such as situations where the buffer is allocated from the stack, the stack pointer may also represent the label for the spillover arguments. Thus, the stack pointer may represent a base address where the native method can place local variables and temporary variables (e.g. the top of the stack), and access spillover arguments at various offsets. In some embodiments, the stack pointer is an implicit argument which is not represented explicitly in the instructions of the raw adapter 505, but the interpreter 108 and/or JIT compiler 109 are configured to automatically place the stack pointer in the appropriate register.

The exact mapping between argument types 506 and storage categories used by the target ABI is not critical and is likely to change drastically from embodiment to embodiment. However, the techniques discussed herein are broad enough to be applicable to virtually any ABI and thus any storage category mappings that may be required.

In some embodiments, the calling convention rules for the target ABI corresponding to the ABI identifier 501 are encoded in logic, such as code within a library, that given a vector of variable types produces a vector of corresponding storage categories and locations for those variable types that adheres to the target ABI. The remainder of the explanation of FIG. 7 assumes that the arguments are represented by an argument vector and the corresponding storage locations are represented by a storage location vector. The storage location vector is assumed to provide the storage locations in ascending order for each storage category before restarting the index for the next storage category. Thus, using the six integer example above, the argument vector may appear as [int1, int2, int3, int4, int5, int6] and the corresponding storage location vector may appear as [GP1, GP2, GP3, Stack+0, Stack+8, Stack+16]. However, other embodiments may use other data structures to map arguments to respective storage locations, such as matrices, lists, trees, graphs, and so forth or may use a different ordering for the storage locations and/or storage categories.

At block 702, the adapter generator 115 generates instructions or metadata specifying the allocations that must be made within certain storage categories to accommodate the arguments. In an embodiment, the adapter generator 115 identifies the storage categories that have unbounded storage and determines how much space is required to store the arguments. For example, in the case of unbounded storage, the adapter generator 115 may look in the storage location vector for the slot that will hold the last argument for that storage category and generate instructions or metadata that specifies to allocate enough space to hold up to that last argument. For instance, if the last argument for that storage category is set to storage location Stack+16 and stack slots are assumed to be 8 bytes in size, at least 24 bytes (number of storage locations used * bytes per storage location) would need to be allocated for that storage category to pass the arguments for the native call.

The instructions or metadata generated by the adapter generator 115 allows the interpreter 108 and/or JIT compiler 109 to pre-allocate the slots in unbounded storage so that when the prolog code 502 is executed there is space to move the associated arguments into the storage slots allocated for that category. In some embodiments, there may be more than one storage category that needs to be allocated, for instance some arguments may be assigned to buffer space on the stack and others may be assigned to buffer space on the heap. As such, metadata or instructions for multiple allocations may be generated at block 702 as required. In such cases, the metadata or instructions may also include an identifier that specifies the exact storage the space should be allocated from (e.g. the stack, the heap, or other memory category) and/or the amount of space that needs to be allocated. Furthermore, the ABI may require that space be allocated for the native method to place return values. If the ABI requires such an allocation to be made, metadata or instructions identifying that allocation are also generated at block 702.

In some embodiments, in addition to the metadata and/or instructions that cause the allocation of unbounded storage categories the adapter generator 115 also emits a CREATE_BUFFER instruction for each storage category for which space was allocated. The CREATE_BUFFER instruction, when processed by the interpreter 108 and/or JIT compiler 109 causes the memory address ("label") for the start of the space allocated to be added to a list, queue, or other data structure. Thus, when the interpreter 108 and/or JIT compiler 109 later processes a PULL_BUFFER_LABEL instruction, the label will then be pulled into the next storage location. For example, the target ABI may require a pointer to a buffer allocated from the stack to be placed in general purpose register A, a pointer to a first object stored in a buffer allocated on the heap to be placed in general purpose register B, and a pointer to a second object stored in a buffer allocated on the heap to be placed in general purpose register C. Thus, at block 702, the adapter generator 115 can emit three CREATE_BUFFER instructions, which would cause the interpreter 108 and/or JIT compiler 109 to store the three labels, which can then be pulled into their respective storage locations using the PULL_BUFFER_LABEL instruction as the storage locations are iterated through.

In some embodiments, the metadata specifying the amount of space to allocate, and the storage category into which they are allocated are rolled into the CREATE_BUFFER instruction, such as appending an identifier specifying the storage location and/or a number of bytes representing the amount of space to allocate, thus causing the CREATE_BUFFER instruction to both cause the interpreter 108 and/or JIT compiler 109 to allocate the space and place the label in an appropriate data structure for later use.

Thus, at the end of block 702, metadata or instructions are generated that when read by the interpreter 108 and/or JIT compiler 109 causes the resultant machine-code instructions, when executed, to cause the virtual machine 104 to allocate space in the specified storage categories and/or keep track of the labels to one or more storage locations within those categories. In the case of bounded storage categories, such as registers, there is typically no need to explicitly allocate space or maintain a label since these typically represent discrete pre-existing locations within the underlying computing architecture 100.

In some embodiments, in cases where the JIT compiler 109 is used to generate the executable adapter 504, the CREATE_BUFFER instruction does not specify the size of the buffer required to be created and/or is not generated with accompanying metadata that specifies the size. Since the JIT compiler 109 can look ahead into the intermediate instructions generated by the adapter generator 115, the JIT compiler 109 may walk through the instructions and determine how much space is required for that buffer based on the call shape. For instance, if the instructions would pull three 8 byte values into the buffer category, then the JIT compiler 109 can determine that a buffer with at least 24 bytes of storage space is required. However, since an interpreter 108 executes one instruction at a time, in order to be interpreted the amount of space to allocate and/or the categories of memory to allocate the space from may be included with the instruction.

At block 703, the adapter generator 115 sorts the arguments based on their associated storage category. For example, assuming that the arguments in the argument vector are {int a, float b, int c} and that the target ABI maps integers to Storage Category 1 and floating point values to Storage Category 2, the arguments would be reordered to group those arguments that would be placed in the same storage category, such as {int a, int c, float b}. In some embodiments, the sorting maintains the order of the arguments as originally presented in the argument vector for arguments that belong to the same category as this may be the order in which the native method (based on the target ABI) expects the arguments to be placed. However, since ABIs can define arbitrary orderings for arguments, this is not a strict rule. The order in which the storage categories are placed, on the other hand, can be arbitrary since ABIs typically do not rely upon the order in which the storage categories are populated, but rather the order in which the locations within each of the storage categories is populated. Depending on the manner in which the adapter generator 115 generates the storage location vector, this vector may already be sorted as described above or may be ordered based on the corresponding argument in the argument vector. In the latter case, the storage location vector is ordered in the same manner described above so as to line up with the corresponding argument in the argument vector.

In some embodiments, such as the one that uses the instruction set discussed above in Section 5.0 "Example Adapter Instruction Set", the interpreter 108 and/or JIT compiler 109 may implicitly assume a particular order in which the storage categories will be processed. In such cases, the adapter generator 115 should adhere to the same ordering to ensure that the instructions of the raw adapter 505 line up with the processing performed by the interpreter 108/JIT compiler 109. However, other embodiments may work around such restrictions by using a modified instruction set that allows specific storage categories to be designated as the next storage category for processing.

In some embodiments, at block 703, the adapter generator 115 also emits instructions that causes the interpreter 108 and/or JIT compiler 109 to reorder the arguments and/or storage location vector in memory according to the same sorting scheme described above. However, in other embodiments, the interpreter 108 and/or JIT compiler 109, in addition to the raw adapter 505, may also take as input the ABI identifier 501. The interpreter 108 and/or JIT compiler 109 would then be capable of identifying the target ABI and performing the same sorting as performed by the adapter generator 115. Reordering an argument array is typically a trivial problem for most modern computing systems and therefore does not add significantly to the overall processing time for performing the native call. Furthermore, in other embodiments the arguments may not actually be sorted, but instead are accessed through a logical interface that uses a level of indirection (such as a linked list) to process the arguments and/or storage locations as though sorted.

In some cases, iterating over the storage locations within each category and determining an argument to pull in can be more efficient than iterating over the arguments and determining a storage location in which to put the argument. For example, the number of operations the adapter needs to perform is bounded by the number of storage locations in each category. Furthermore, if the iteration reaches a particular storage location, such as a particular register, it is implicitly known that the register is free and not mapped to any other argument. However, in the reverse case, logic would need to be embedded in the adapter generator 115 to check whether any additional locations of the storage class to which the argument corresponds is still available.

Thus, iterating over storage locations rather than the arguments can make the implementation of the interpreter 108 which interprets the raw adapter 505 or the JIT compiler 109 which compiles the raw adapter 505 simpler. Since registers cannot be accessed by an index number (they are referred to by "name" when generating assembly/machine code), performing determinations on arguments would require a branch from the argument depending on availability into one of a number of branches which would be equal to the number of registers that would be available of the applicable storage type. Hand coding this type of mapping could be extremely tedious. However, if the instructions for the raw adapter 505 are designed to iterate over storage locations, the branching is not required and the interpreter 108 and/or JIT compiler 109 can simply grab the next argument (which does not require the program to branch) when emitting assembly/machine code naming the register and which loads that argument into the register.

In some embodiments, the adapter generator 115 keeps track of the storage categories, storage locations within a storage category, and arguments that have yet to be processed in one or more ordering structures, such as stacks, queues, lists, and so forth. For example, the ordering structures may be the argument vector, the storage location vector, and a list which keeps track of the indices of the storage location vector where each storage category ends. Another example could be an argument vector and a two-dimensional matrix indexed by {storage location index, storage category index}. In the following description, when the term "next" is used in conjunction with a storage category, storage location, or argument, this is intended to be shorthand for the adapter generator 115 advancing the index to the next item in the corresponding ordering structure. In order to illustrate clear examples, the ordering structure used to keep track of progress through the arguments is assumed to be the argument vector and the ordering structure used to keep track of progress through the storage locations is assumed to be the storage location vector.

At block 704, the adapter generator 115 selects the next storage location and the next argument. In an embodiment, the adapter generator 115 selects the next storage location by advancing an index into the storage location vector, starting with the initial index into the storage location vector. In an embodiment, the adapter generator 115 selects the next argument by advancing an index into the argument vector, starting with the initial index into the argument vector.

At block 705, the adapter generator 115 generates SKIP instructions based on the number of storage locations skipped. In an embodiment, the adapter generator 115 determines how many storage locations were skipped within the same storage category that were not assigned to one of the argument types 506. For example, if the first set of storage locations belong to the general purpose register category and the storage location at the initial index is represented by general purpose register 3, then the adapter generator 115 would issue two SKIP instructions specifying that the first two general purpose registers were skipped. As another example, if the storage category being processed is space on the stack and the storage locations being iterated over jump from Stack+0 in the previous location to Stack+16 in the next storage location, then Stack+8 was skipped (assuming 8 byte slots) and therefore the adapter generator 115 would issue one SKIP instruction. Furthermore, if there were no skipped storage locations between the previous index into the storage location vector and the next storage location in the storage location vector, then no SKIP instructions would be issued.

At block 706, the adapter generator 115 determines whether the currently selected argument is a label. If the currently selected argument is a label, then the adapter generator 115 proceeds to block 707. Otherwise, the adapter generator 115 proceeds to block 708.

At block 707, the adapter generator 115 generates a PULL_BUFFER_LABEL instruction. In an embodiment, at block 707, the adapter generator 115 is currently processing an argument added to the argument vector as a result of a calling convention rule of the target ABI requiring a memory address to an unbounded storage category to be placed in the currently selected location. Thus, the adapter generator 115 generates the PULL_BUFFER_LABEL instruction to cause the interpreter 108 and/or JIT compiler 109 to execute machine instructions which would pull the label from the structure holding the labels generated by the CREATE_BUFFER instruction into the currently selected storage location.

At block 708, the adapter generator 115 generates a PULL instruction. In an embodiment, the adapter generator 115 is currently processing an argument that needs to be pulled into the current storage location in accordance with the target ABI. Thus, the PULL instruction, when eventually processed by the interpreter 108 and/or JIT compiler 109 causes the execution of machine instructions which would pull the argument from the vector of passed in arguments into the current storage location.

At block 709, the adapter generator 115 determines whether the currently selected storage location is the last storage location to be processed for the storage category to which the currently selected storage location belongs. In an embodiment, the adapter generator 115 determines when the last storage location within the storage category is reached by consulting an ordering structure that maintains a list of indices into the storage location vector signifying when the locations of each storage category end. If the last storage location within the storage category has been reached, the adapter generator 115 proceeds to block 710. Otherwise, the adapter generator 115 returns to block 704.

At block 710, the adapter generator 115 generates a STOP instruction. In an embodiment, the adapter generator 115 generates the STOP instruction as a signal to the interpreter 108 and/or JIT compiler 109 to proceed to the next storage category. In some embodiments, at block 710, the adapter generator 115 looks ahead into the storage location vector and determines whether there are any skipped storage categories would be processed before the storage category to which the next storage location belongs. In such cases, the adapter generator 115 may issue additional STOP instructions to signal to the interpreter 108 and/or JIT compiler 109 that those storage categories are not used by this particular native call.

The algorithm illustrated by FIG. 7 ends when there are no more storage locations to process in the storage location vector. However, in some embodiments, if there are storage categories that are used by the target ABI, but do not have any storage locations into which arguments will be placed, the adapter generator 115, prior to completing the prolog code 502, will issue one or more STOP instructions signaling to the interpreter 108 and/or JIT compiler 109 that those storage categories are empty for the purpose of this particular native call. However, the interpreter 108 and/or JIT compiler 109 may implicitly assume that if the prolog code 502 end prematurely, then the remaining storage categories are unused.

8.0 Adapter Generator Epilog Process Flow

The process flow for producing epilog code 503 for the raw adapter 505 is virtually the same logical process flow as depicted above in FIG. 7. The primary difference is that the storage categories and locations being iterated over are those used by the source ABI, the calling convention rules being used to determine the assignments between return types and storage locations are the calling convention rules of the source ABI, and the argument types 506 of the call shape 500 are replaced with the result types 507 of the call shape 500. Thus, the process flow for generating the epilog code 503 is virtually the same logic discussed above with respect to FIG. 7 with the only differences being references to the target ABI being replaced with the source ABI and the references to argument types 506 being replaced with references to the result types 504. Furthermore, steps taken to allocate space for the return types 507 discussed above with respect to FIG. 7 may be skipped since control is not passed back to the native method when the callee has completed execution.

In some embodiments, the adapter generator 115 is agnostic with respect to whether the code being generated is prolog code 502 or epilog code 503. For example, the virtual machine 104 to generate the raw adapter 505 may invoke the adapter generator 115 twice, first using a vector of types representing the argument types 506 and supplying an identifier for the target ABI to produce the prolog code 502 and then a second time using a vector of types representing the return types 507 and supplying an identifier for the source ABI to produce the epilog code 503. The virtual machine 104 may then package the generated prolog code 502 and epilog code 503 together to form the raw adapter 505.

9.0 Code Generation Examples

The following presents an example of generating prolog code 502 assuming the following characteristics of the target ABI. Assume that the target ABI uses four storage categories, (1) i general registers, (2) k vector registers, (3), a first buffer and (4) a second buffer. For the purpose of presenting the following example, the first buffer is assumed to be allocated on the stack and the second buffer is assumed to be allocated on the heap. However, where the buffer space is allocated is not critical and may vary from embodiment to embodiment. In addition, assume the ABI defines the following rules, (1) primitive types (e.g. ints, doubles, floats, bytes, etc.) are placed in the first available general register with spillover on the first buffer, (2) vector types are placed in the first available vector register with spillover onto the second buffer. Also, assume that the ABI specifies an order in which to populate storage locations within each storage category based on the order of the arguments as presented. For example, within the general register storage category, RegA may be tied to the first passed argument of a primitive type, RegB may be tied to the second passed argument of a primitive type, and so forth. In cases of complex types, such as structs or any other hybrid structure, the complex type may be broken down into its constituent parts and each may be treated as a separate argument by the adapter generator 115. Thus, if there is a type passed in representing a point in space, the point type may be broken down into the two floating point types representing the x and y coordinates of the point.

In an embodiment, in response to receiving the argument types 506 and/or return types 507 of a call shape 500 to a native method which adhere to the example ABI, the adapter generator 115 sorts the argument types based on storage category. For example, the sorting may group together argument types that may be stored within each storage category according to the ABI while maintaining the argument order within the category. For instance, "int1 int2 vector1 int3 vector2" may be sorted into "int1 int2 int3 vector1 vector2". Furthermore, the order of the storage categories may correspond to the order in which the storage categories will be mapped by the adapter generator 115 and considered by the interpreter 108 and/or JIT compiler 109. Thus, the previous example assumes that the general purpose registers are mapped before the vector registers. In some embodiments, the sorting also causes the adapter generator 115 to emit instructions which would sort the values of the arguments that are provided during the call. However, in other embodiments, the interpreter 108 and/or JIT compiler 109 are programmed with logic to perform the aforementioned sorting for native calls even in the absence of explicit instructions from the raw adapter 505.

Next, the adapter pulls from metadata the ordering of storage locations within each storage category. For example, in the case of general registers, the adapter may pull the names of each general register and store those names in an array in an order that corresponds to the order in which those registers should be populated. The adapter then iterates through the argument types and determines how much storage will be required within each storage category. For example, if the number of arguments corresponding to primitives exceeds i the remainder would need to be allocated on the first buffer. Similarly, if the number of vector arguments exceeds k the remainder would need to be allocated on the second buffer. Depending on the embodiment, the aforementioned allocation may be shorthand for generating instructions or metadata which signal the interpreter 108 and/or JIT compiler 109 to perform the necessary allocations. In addition, in some embodiments, the types which would be spilled over are reclassified to the appropriate storage category that will handle the spillover and potentially resorted according to the ordering rules of the target ABI.

Next, the adapter iterates over storage locations within each category and generates instructions which define the mapping between the argument types and locations within the storage categories. For example, assume i=5, argument types include 5 integers and 2 doubles, and the adapter creates mappings for second buffer initially, then the first buffer, then general registers, then vector registers. After sorting, the arguments should appear as "d1, d2, i1, i2, i3, i4, i5". For the second buffer, no values will be populated and thus the adapter emits a STOP instruction which resets the index and moves on to the next storage category. For the first buffer, the adapter emits PULL, SKIP, PULL, SKIP, STOP. The two PULL statements would pull in the values of d1 and d2 respectively. Furthermore, since these are doubles, the space taken up by each is twice that of an integer. Assuming that the storage locations on the stack are indexed at a granularity equal to that of an integer, the SKIP instructions ensure that enough space is left to hold each double without part of one being overwritten by the subsequent PULL instruction. The STOP instruction then signals to move onto the next storage category. In the general register category, the adapter would emit five PULL instructions to pull in the values of i1, i2, i3, i4, and i5 followed by a STOP instruction. Finally, for the vector register category, a STOP instruction would be emitted since there are no argument types to map to vector registers.

In some embodiments, while performing the sorting, the adapter generator 115 counts the number of arguments that would be placed in each category. As a result, for each category, a loop is performed based on the counted number that iterates over storage locations within the category, with PULL and potentially SKIP instructions being emitted based on the ABI and size of the corresponding argument type that would be pulled in by the PULL instruction. At the end of the loop, a STOP instruction is emitted.

In some cases, the target ABI may require one or more labels to be included which identifies the base memory addresses of the buffers. For example, some ABIs require that labels to the buffers be supplied in the earliest available general purpose registers. Thus, in such cases, the adapter generator 115 may add one or more labels to the buffers to the arguments and ensure that those labels are the first arguments populated into the general purpose registers. In such cases, there may be an one or more CREATE_BUFFER instructions issued to allocate space onto the appropriate buffer and one or more PULL_BUFFER_LABEL instructions issued to pull the label for the buffers into their appropriate registers.

In some cases, storage classes may have variable width, as defined by the size of data that can be stored within an individual storage location of that storage type. For example, vector registers in some cases, have various widths which may be divided into separate storage classes. In addition, in some cases, embodiments may include information in the prolog code 502 and/or epilog code 503 which specify the width of storage locations within particular storage categories.

In some embodiments, the storage classes that are utilized by an ABI include a "handles" storage class, which represents an array where the locations within the array represent labels which can be pulled into storage locations of other categories, such as registers. For example, the "handles" storage classes may be used to store and pass references to managed pointers to the called native code.

10.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
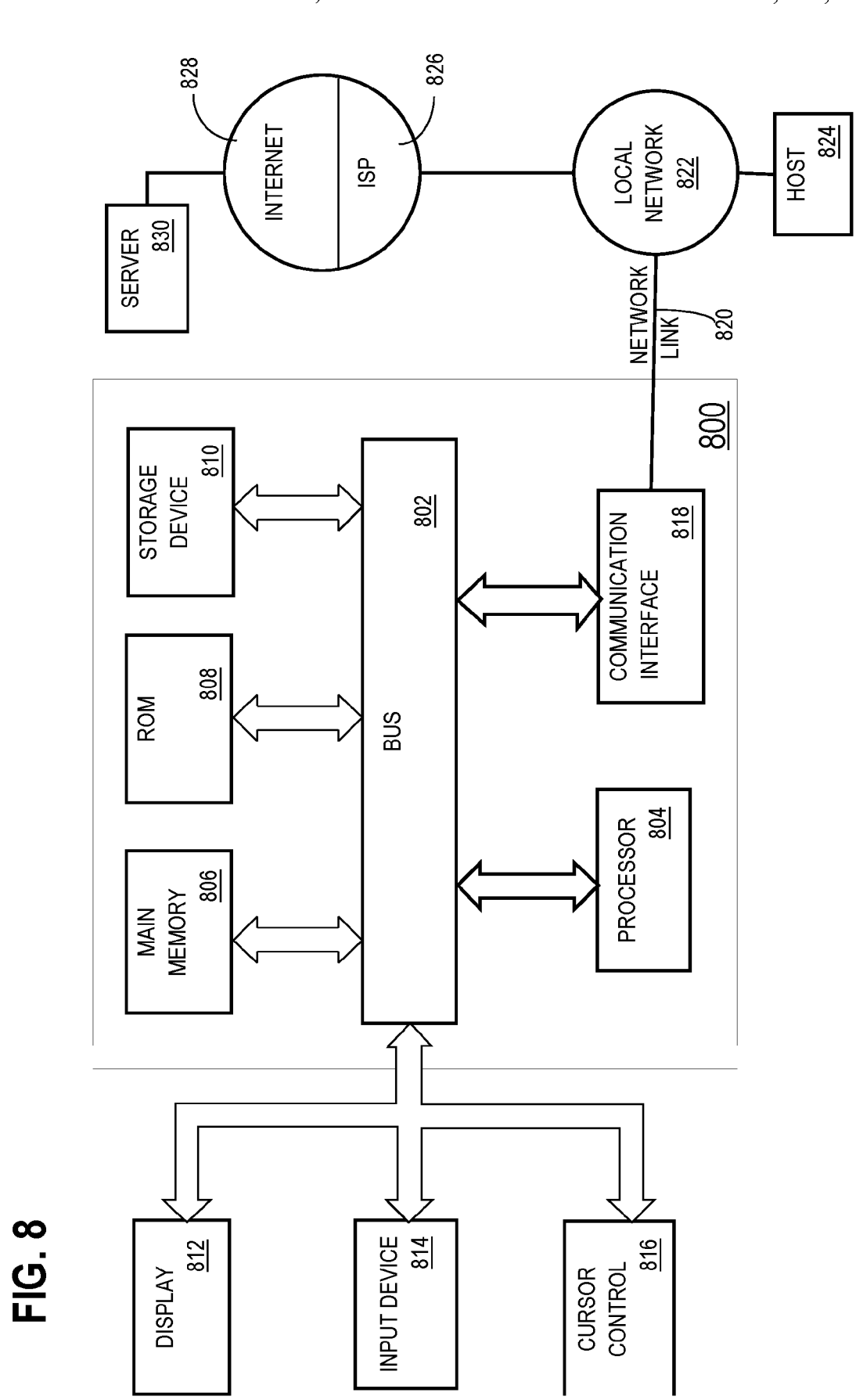
FIG. 8 is a block diagram that illustrates a computer system upon which an embodiment of the invention may be implemented.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a light emitting diode (LED) display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

11.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

12.0 First Additional Disclosure

Aspects of the subject matter described herein are set out in the following numbered clauses:

1. A method comprising: receiving a call shape of a call between a caller and a callee, wherein the caller represents a first set of instructions executing within a first environment adhering to a first application binary interface (ABI) and the callee represents a second set of instructions compiled for a second environment that adheres to a second ABI, wherein the call shape of the call specifies one or more argument types for the call; generating a memory representation for data corresponding to the one or more argument types that adheres to the second ABI based on: the call shape of the call, metadata describing the second ABI, and a set of calling convention rules for assigning the one or more argument types to one or more storage locations, wherein the metadata describing the second ABI specifies one or more storage categories that are available under the second ABI; invoking the callee using the memory representation to pass the data corresponding to the one or more argument types to the callee.

2. The method of Clause 1, wherein the one or more storage categories that are available under the second ABI include one or more of: general purpose registers, vector registers, stack slots, or heap space.

3. The method of any of Clauses 1-2, using an adapter generator, generating one or more intermediate instructions which describe how one or more values represented by the one or more argument types are pulled into a respective one or more storage locations of each storage category of the one or more storage categories in order to pass the one or more values to the callee; using one or more of: an interpreter or a compiler, converting the one or more intermediate instructions into machine instructions for a hardware platform upon which the first environment is executing, wherein executing the machine instructions causes the one or more values to be pulled into the respective one or more storage locations for each storage category of the one or more storage categories.

4. The method of any of Clauses 1-3, wherein the metadata identifies mappings between the one or more argument types and the one or more storage categories and generating the memory representation comprises: sorting the one or more argument types for the call based on a storage category of the one or more storage categories to which each argument type of the one or more argument types belong to produce a sorted set of argument types for each storage category of the one or more storage categories; for each storage category of the one or more storage categories, iterating through an ordered set of storage locations within the storage category, wherein while iterating through a current storage location of the ordered set of storage locations, identifying a corresponding argument type within the sorted set of argument types and emitting an instruction specifying that a value represented by the corresponding argument type is to be pulled into the current storage location.

5. The method of Clause 4, wherein sorting the one or more argument types for the call includes counting a number of the one or more argument types which belong to each storage category of the one or more storage categories, wherein iterating through the ordered set of storage locations within the storage category iterates over a number of storage locations based on the number of the one or more argument types which belong to the storage category.

6. The method of Clause 5, wherein after iterating through the ordered set of storage locations within the storage category, emitting an instruction which specifies to stop pulling values for the storage category.

7. The method of any of Clauses 5-6, wherein counting the number of the one or more argument types includes determining a set of the one or more argument types that cannot be stored within a storage category to which the metadata specifies the set of the one or more argument types belongs and remapping the set of the one or more argument types to belong to a spillover category of the one or more storage categories.

8. The method of any of Clauses 4-7, further comprising emitting one or more instructions which cause one or more received values corresponding to the one or more argument types for the call to be sorted in a same order as the one or more argument types prior to executing one or more instructions which pull the one or more received values into one or more corresponding storage locations within a particular storage category of the one or more storage categories.

9. The method of any of Clauses 1-8, wherein the one or more storage categories includes a buffer category which represents temporary storage space where a set of values for a set of the one or more argument types can be stored and further comprising: generating an instruction that allocates space for the buffer category and which causes a memory address label for the temporary storage space to be added to a data structure; generating an instruction that pulls the memory address label from the data structure into a particular storage location of the one or more storage categories.

10. The method of Clause 9, wherein the particular storage location is a register.

11. The method of any of Clauses 1-10, wherein the first environment is a Java Virtual Machine.

12. The method of any of Clauses 1-11, wherein the call shape specifies one or more return types for the call and further comprising: receiving second data representing one or more return values from invoking the callee which are stored in a second memory representation that adheres to the second ABI; generating a third memory representation for the second data that adheres to the first ABI.

13. The method of Clause 12, wherein generating the third memory representation comprises: using an adapter generator, generating one or more intermediate instructions which describe how one or more values represented by the one or more return types are pulled into a respective one or more storage locations of each storage category of a second one or more storage categories supported by the first ABI in order to pass the one or more values to the caller;

using one or more of: an interpreter or a compiler, converting the one or more intermediate instructions into machine instructions for a hardware platform upon which the first environment is executing, wherein executing the machine instructions causes the one or more values to be pulled into the respective one or more storage locations for each storage category of the second one or more storage categories.

14. The method of Clause 13, further comprising returning the one or more return values to the caller using the third memory representation.

15. One or more non-transitory computer-readable media storing instructions that, when executed by one or more computing devices, causes performance of any one of the methods recited in Clauses 1-14.

16. A system comprising one or more computing devices comprising components, implemented at least partially by computing hardware, configured to implement the steps of any one of the methods recited in Clauses 1-14.

What is claimed is:

1. A method comprising:
receiving a call shape of a call between a caller and a callee, wherein the caller represents a first set of instructions executing within a first environment adhering to a first application binary interface (ABI) and the callee represents a second set of instructions compiled for a second environment that adheres to a second ABI, wherein the call shape of the call specifies a plurality of argument types for the call;
generating a memory representation for data corresponding to the plurality of argument types that adheres to the second ABI based on: the call shape of the call, metadata describing the second ABI, and a set of calling convention rules for assigning the plurality of argument types to a plurality of storage locations, wherein:
the metadata describing the second ABI specifies a plurality of distinct storage categories that are available under the second ABI,
the plurality of distinct storage categories includes a buffer category which represents an allocation within a heap where values for a subset of the plurality of argument types can be stored, and
said memory representation for data corresponding to the plurality of argument types that adheres to the second ABI uses multiple storage categories of said plurality of distinct storage categories and contains a memory address of said allocation within the heap;
invoking the callee using the memory representation to pass the data corresponding to the plurality of argument types to the callee.

2. The method of claim 1, wherein generating the memory representation comprises:
using an adapter generator, generating one or more intermediate instructions which describe how one or more values represented by the plurality of argument types are pulled into a respective one or more storage locations of each storage category of the plurality of storage categories in order to pass the one or more values to the callee;
using one or more of: an interpreter or a compiler, converting the one or more intermediate instructions into machine instructions for a hardware platform upon which the first environment is executing, wherein executing the machine instructions causes the one or more values to be pulled into the respective one or more storage locations for each storage category of the plurality of storage categories.

3. The method of claim 1 further comprising:
generating an instruction that allocates space for the buffer category and which causes a memory address label for a temporary storage space to be added to a data structure;
generating an instruction that pulls the memory address label from the data structure into a particular storage location of the plurality of storage categories.

4. The method of claim 3, wherein the particular storage location is a register.

5. The method of claim 1, wherein the first environment is a Java Virtual Machine.

6. The method of claim 1, wherein the call shape specifies one or more return types for the call, and the method further comprises:
receiving second data representing one or more return values from invoking the callee which are stored in a second memory representation that adheres to the second ABI;
generating a third memory representation for the second data that adheres to the first ABI.

7. The method of claim 6, wherein generating the third memory representation comprises:
using an adapter generator, generating one or more intermediate instructions which describe how one or more values represented by the one or more return types are pulled into a respective one or more storage locations of each storage category of a second one or more storage categories supported by the first ABI in order to pass the one or more values to the caller;
using one or more of: an interpreter or a compiler, converting the one or more intermediate instructions into machine instructions for a hardware platform upon which the first environment is executing, wherein executing the machine instructions causes the one or more values to be pulled into the respective one or more storage locations for each storage category of the second one or more storage categories.

8. The method of claim 7, further comprising returning the one or more values to the caller using the third memory representation.

9. The method of claim 1 wherein:
said call shape comprises a first argument and a second argument that have a same argument type of said plurality of argument types;
said first argument does not use a same storage category as said second argument.

10. The method of claim 9 wherein:
said multiple storage categories comprise a first storage category and a second storage category;
assigning said first argument to said first storage category causes assigning said second argument to said second storage category.

11. A method comprising:
receiving a call shape of a call between a caller and a callee, wherein the caller represents a first set of instructions executing within a first environment adhering to a first application binary interface (ABI) and the callee represents a second set of instructions compiled for a second environment that adheres to a second ABI, wherein the call shape of the call specifies one or more argument types for the call;
generating a memory representation for data corresponding to the one or more argument types that adheres to the second ABI based on: the call shape of the call, metadata describing the second ABI, and a set of calling convention rules for assigning the one or more argument types to one or more storage locations, wherein the metadata describing the second ABI specifies one or more storage categories that are available under the second ABI;

invoking the callee using the memory representation to pass the data corresponding to the one or more argument types to the callee;

wherein the metadata identifies mappings between the one or more argument types and the one or more storage categories and generating the memory representation comprises:

sorting the one or more argument types for the call based on a storage category of the one or more storage categories to which each argument type of the one or more argument types belong to produce a sorted set of argument types for each storage category of the one or more storage categories;

for each storage category of the one or more storage categories, iterating through an ordered set of storage locations within the storage category, wherein while iterating through a current storage location of the ordered set of storage locations, identifying a corresponding argument type within the sorted set of argument types and emitting an instruction specifying that a value represented by the corresponding argument type is to be pulled into the current storage location.

12. The method of claim 11, wherein sorting the one or more argument types for the call includes counting a number of the one or more argument types which belong to each storage category of the one or more storage categories, wherein iterating through the ordered set of storage locations within the storage category iterates over a number of storage locations based on the number of the one or more argument types which belong to the storage category.

13. The method of claim 12, wherein after iterating through the ordered set of storage locations within the storage category, emitting an instruction which specifies to stop pulling values for the storage category.

14. The method of claim 12, wherein counting the number of the one or more argument types includes determining a set of the one or more argument types that cannot be stored within a storage category to which the metadata specifies the set of the one or more argument types belongs and remapping the set of the one or more argument types to belong to a spillover category of the one or more storage categories.

15. The method of claim 11, further comprising emitting one or more instructions which cause one or more received values corresponding to the one or more argument types for the call to be sorted in a same order as the one or more argument types prior to executing one or more instructions which pull the one or more received values into one or more corresponding storage locations within a particular storage category of the one or more storage categories.

16. A non-transitory computer-readable medium storing one or more instructions that, when executed by one or more processors, cause:

receiving a call shape of a call between a caller and a callee, wherein the caller represents a first set of instructions executing within a first environment adhering to a first application binary interface (ABI) and the callee represents a second set of instructions compiled for a second environment that adheres to a second ABI, wherein the call shape of the call specifies a plurality of argument types for the call;

generating a memory representation for data corresponding to the plurality of argument types that adheres to the second ABI based on: the call shape of the call, metadata describing the second ABI, and a set of calling convention rules for assigning the plurality of argument types to a plurality of storage locations, wherein:

the metadata describing the second ABI specifies a plurality of distinct storage categories that are available under the second ABI, the plurality of distinct storage categories includes a buffer category which represents an allocation within a heap where values for a subset of the plurality of argument types can be stored, and said memory representation for data corresponding to the plurality of argument types that adheres to the second ABI uses multiple storage categories of said plurality of distinct storage categories and contains a memory address of said allocation within the heap;

invoking the callee using the memory representation to pass the data corresponding to the plurality of argument types to the callee.

17. The non-transitory computer-readable medium of claim 16, wherein generating the memory representation comprises:

using an adapter generator, generating one or more intermediate instructions which describe how one or more values represented by the plurality of argument types are pulled into a respective one or more storage locations of each storage category of the plurality of storage categories in order to pass the one or more values to the callee;

using one or more of: an interpreter or a compiler, converting the one or more intermediate instructions into machine instructions for a hardware platform upon which the first environment is executing, wherein executing the machine instructions causes the one or more values to be pulled into the respective one or more storage locations for each storage category of the plurality of storage categories.

18. The non-transitory computer-readable medium of claim 17, wherein the instructions further cause emitting one or more instructions which cause one or more received values corresponding to the plurality of argument types for the call to be sorted in a same order as the plurality of argument types prior to executing one or more instructions which pull the one or more received values into one or more corresponding storage locations within a particular storage category of the plurality of storage categories.

19. The non-transitory computer-readable medium of claim 16, wherein the plurality of storage categories includes a buffer category which represents temporary storage space where a set of values for a set of the plurality of argument types can be stored and the instructions further cause:

generating an instruction that allocates space for the buffer category and which causes a memory address label for the temporary storage space to be added to a data structure;

generating an instruction that pulls the memory address label from the data structure into a particular storage location of the plurality of storage categories.

20. The non-transitory computer-readable medium of claim 19, wherein the particular storage location is a register.

21. The non-transitory computer-readable medium of claim 16, wherein the first environment is a Java Virtual Machine.

22. The non-transitory computer-readable medium of claim 16, wherein the call shape specifies one or more return types for the call, and the instructions further cause:

receiving second data representing one or more return values from invoking the callee which are stored in a second memory representation that adheres to the second ABI;

generating a third memory representation for the second data that adheres to the first ABI.

23. The non-transitory computer-readable medium of claim 22, wherein generating the third memory representation comprises:

using an adapter generator, generating one or more intermediate instructions which describe how one or more values represented by the one or more return types are pulled into a respective one or more storage locations of each storage category of a second one or more storage categories supported by the first ABI in order to pass the one or more values to the caller;

using one or more of: an interpreter or a compiler, converting the one or more intermediate instructions into machine instructions for a hardware platform upon which the first environment is executing, wherein executing the machine instructions causes the one or more values to be pulled into the respective one or more storage locations for each storage category of the second one or more storage categories.

24. The non-transitory computer-readable medium of claim 23, wherein the instructions further cause returning the one or more return values to the caller using the third memory representation.

25. A non-transitory computer-readable medium storing one or more instructions that, when executed by one or more processors, cause:

receiving a call shape of a call between a caller and a callee, wherein the caller represents a first set of instructions executing within a first environment adhering to a first application binary interface (ABI) and the callee represents a second set of instructions compiled for a second environment that adheres to a second ABI, wherein the call shape of the call specifies one or more argument types for the call;

generating a memory representation for data corresponding to the one or more argument types that adheres to the second ABI based on: the call shape of the call, metadata describing the second ABI, and a set of calling convention rules for assigning the one or more argument types to one or more storage locations, wherein the metadata describing the second ABI specifies one or more storage categories that are available under the second ABI;

invoking the callee using the memory representation to pass the data corresponding to the one or more argument types to the callee;

wherein the metadata identifies mappings between the one or more argument types and the one or more storage categories and generating the memory representation comprises:

sorting the one or more argument types for the call based on a storage category of the one or more storage categories to which each argument type of the one or more argument types belong to produce a sorted set of argument types for each storage category of the one or more storage categories;

for each storage category of the one or more storage categories, iterating through an ordered set of storage locations within the storage category, wherein while iterating through a current storage location of the ordered set of storage locations, identifying a corresponding argument type within the sorted set of argument types and emitting an instruction specifying that a value represented by the corresponding argument type is to be pulled into the current storage location.

26. The non-transitory computer-readable medium of claim 25, wherein sorting the one or more argument types for the call includes counting a number of the one or more argument types which belong to each storage category of the one or more storage categories, wherein iterating through the ordered set of storage locations within the storage category iterates over a number of storage locations based on the number of the one or more argument types which belong to the storage category.

27. The non-transitory computer-readable medium of claim 26, wherein after iterating through the ordered set of storage locations within the storage category, emitting an instruction which specifies to stop pulling values for the storage category.

28. The non-transitory computer-readable medium of claim 27, wherein counting the number of the one or more argument types includes determining a set of the one or more argument types that cannot be stored within a storage category to which the metadata specifies the set of the one or more argument types belongs and remapping the set of the one or more argument types to belong to a spillover category of the one or more storage categories.

* * * * *

UNITED STATES PATENT AND TRADEMARK OFFICE
CERTIFICATE OF CORRECTION

PATENT NO. : 10,452,409 B2
APPLICATION NO. : 15/331188
DATED : October 22, 2019
INVENTOR(S) : Rose et al.

Page 1 of 1

It is certified that error appears in the above-identified patent and that said Letters Patent is hereby corrected as shown below:

On the Title Page

In Column 2, under Abstract, Lines 5-6, after "to" delete "a second memory representation adhering to".

In the Drawings

On sheet 5 of 8, in FIG. 5A, under Reference Numeral 503, Line 1, delete "Eplilog" and insert -- Epilog --, therefor.

On sheet 5 of 8, in FIG. 5B, under Reference Numeral 503, Line 1, delete "Eplilog" and insert -- Epilog --, therefor.

On sheet 5 of 8, in FIG. 5B, under Reference Numeral 510, Line 1, delete "Eplilog" and insert -- Epilog --, therefor.

In the Specification

In Column 29, Line 3, delete "At" and insert -- at --, therefor.

Signed and Sealed this
Sixteenth Day of February, 2021

Drew Hirshfeld
*Performing the Functions and Duties of the
Under Secretary of Commerce for Intellectual Property and
Director of the United States Patent and Trademark Office*